(12) United States Patent
Ohashi

(10) Patent No.: US 7,535,654 B2
(45) Date of Patent: May 19, 2009

(54) ZOOM LENS, IMAGING DEVICE, AND PERSONAL DIGITAL ASSISTANT

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/762,435

(22) Filed: Jun. 13, 2007

(65) Prior Publication Data

US 2007/0297068 A1    Dec. 27, 2007

(30) Foreign Application Priority Data

Jun. 22, 2006  (JP) .............................. 2006-172466
Aug. 1, 2006   (JP) .............................. 2006-210240

(51) Int. Cl.
   *G02B 15/14*    (2006.01)
(52) U.S. Cl. ...................................... 359/690; 359/687
(58) Field of Classification Search ................. 359/686, 359/687, 690
   See application file for complete search history.

(56) References Cited

U.S. PATENT DOCUMENTS

| | | | | |
|---|---|---|---|---|
| 4,439,017 | A | * | 3/1984 | Yamaguchi ................. 359/687 |
| 5,760,966 | A | | 6/1998 | Tanaka et al. |
| 6,995,921 | B2 | | 2/2006 | Ohashi |
| 7,095,564 | B2 | | 8/2006 | Ohashi |
| 7,151,638 | B2 | | 12/2006 | Ohashi |
| 7,167,320 | B2 | | 1/2007 | Ohashi |
| 2004/0161228 | A1 | | 8/2004 | Nanba |
| 2005/0036206 | A1 | | 2/2005 | Wada |
| 2005/0094002 | A1 | | 5/2005 | Ohashi |
| 2005/0270661 | A1 | | 12/2005 | Nanba et al. |
| 2006/0262422 | A1 | | 11/2006 | Ohashi |
| 2007/0297068 | A1 | | 12/2007 | Ohashi |

FOREIGN PATENT DOCUMENTS

| | | |
|---|---|---|
| JP | 8-248317 | 9/1996 |
| JP | 3391342 | 1/2003 |
| JP | 2004-212616 | 7/2004 |
| JP | 2004-333768 | 11/2004 |
| JP | 2005-242116 | 9/2005 |
| JP | 2005-326743 | 11/2005 |
| JP | 2006-126741 | 5/2006 |

(Continued)

OTHER PUBLICATIONS

U.S. Appl. No. 11/873,078, filed Oct. 16, 2007, Ohashi.

*Primary Examiner*—William C Choi
(74) *Attorney, Agent, or Firm*—Oblon, Spivak, McClelland, Maier & Neustadt, P.C.

(57) ABSTRACT

The invention provides a zoom lens capable of achieving a half angle of view over 38 degrees at the wide-angle end, a magnification ratio 6.5 to 10 or more, and a resolving power corresponding to an imaging element of 5 to 8 million pixels, with a configuration of as few as 10 to 11 pieces of lenses. The zoom lens of the invention includes a first lens group through a third lens group I to III of positive/negative/positive in order from the object side, or further includes a fourth lens group of positive IV. In the zoom lens, when changing magnification from a wide-angle end toward a telephoto end, a spacing between the first lens group and the second lens group increases and a spacing between the second lens group and the third lens group decreases.

15 Claims, 20 Drawing Sheets

FOREIGN PATENT DOCUMENTS

| | | |
|---|---|---|
| JP | 2006-235062 | 9/2006 |
| JP | 2006-308957 | 11/2006 |
| JP | 2006-330657 | 12/2006 |
| JP | 2006-337592 | 12/2006 |
| JP | 2007-114378 | 5/2007 |
| JP | 2007-241223 | 9/2007 |
| JP | 2008-33212 | 2/2008 |
| JP | 2008-96924 | 4/2008 |
| JP | 2008-158481 | 7/2008 |

* cited by examiner

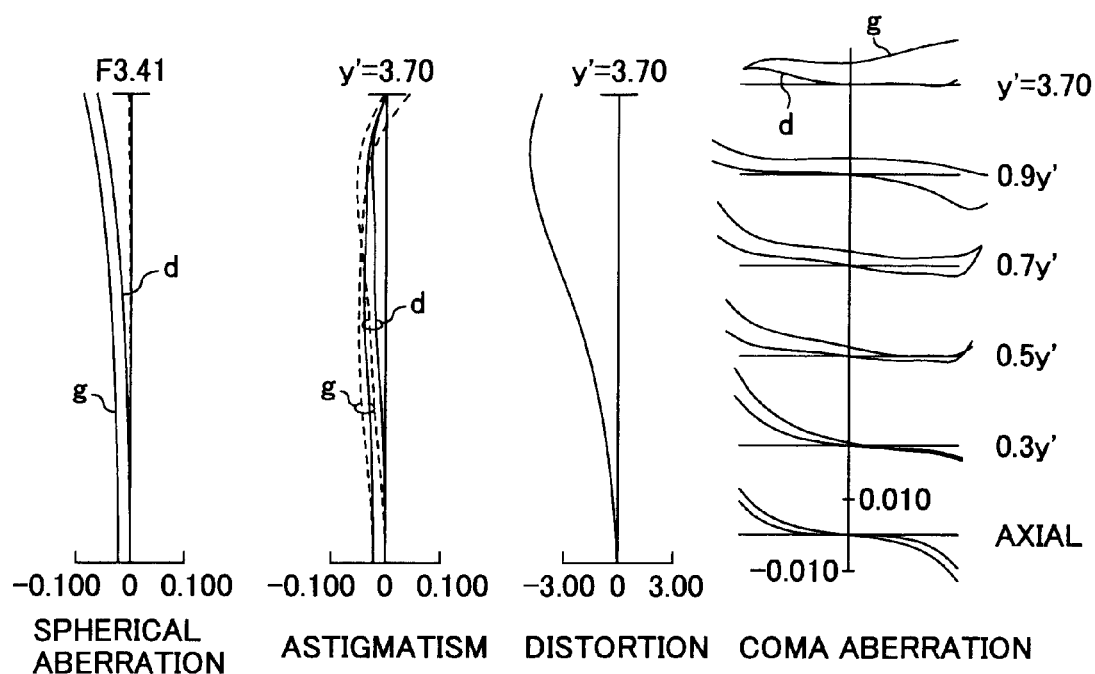
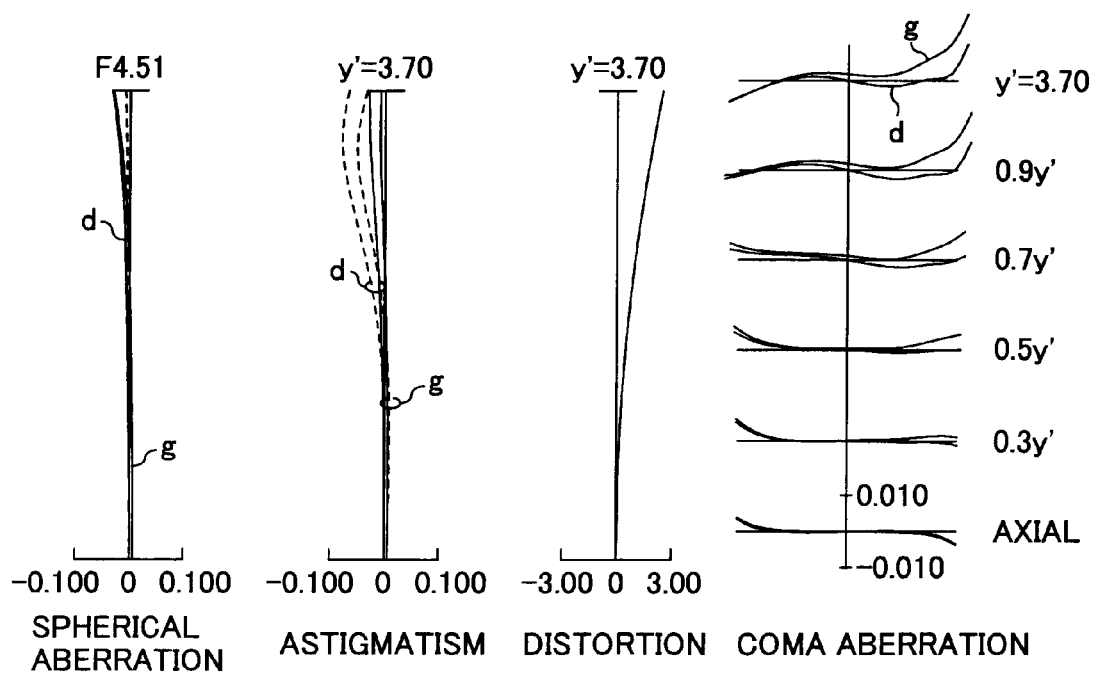

ZOOM LENS, IMAGING DEVICE, AND PERSONAL DIGITAL ASSISTANT

PRIORITY CLAIM

This application claims priority from Japanese Patent Application No. 2006-172466, filed with the Japanese Patent Office on Jun. 22, 2006, and Japanese Patent Application No. 2006-210240, filed with the Japanese Patent Office on Aug. 1, 2006, the contents of which are incorporated herein by reference in their entirety.

BACKGROUND OF THE INVENTION

1. Field of the Invention

The present invention relates to a zoom lens, an imaging device, and a personal digital assistant.

2. Related Art

Accompanied with the wide spread of an imaging device represented by a digital camera, the general trend seeks for further improvement of a photographed quality and further downsizing of the device body, and it seeks for higher performance as well as further downsizing of the zoom lens used as a photographing lens.

In view of further downsizing of the zoom lens, first, the total lens length in use (distance from the lens surface on the most object side to the image surface) has to be shortened, and it is important to shorten the thickness of each lens group and to control the total length when the zoom lens is put in storage.

In view of higher performance, it is preferable to secure a resolving power corresponding to an imaging element of at least 5 to 8 million pixels, throughout the whole zooming range.

Further, the wide angle of view of the zoom lens is strongly requested, and it is preferable that the half angle of view at the wide-angle end is over 38 degrees "corresponding to the focal length 28 mm in terms of the 35 mm silver halide camera (the so-called Leica type)". The magnification ratio is also desired to be as high as possible; provided that the zoom lens has the magnification ratio corresponding to the focal length 28 to 200 mm in terms of the 35 mm silver halide camera (about the multiplication 7.1), it is considered as possible to deal with almost all of general photographing. Further, a zoom lens with the magnification ratio corresponding to the focal length 28 to 300 mm (about the multiplication 10.7) will cover a still wider photographing zone.

On the other hand, a chromatic aberration is likely to develop accompanied with pursuing a higher magnification ratio and a longer focal length; and it is well-known that the use of a "lens having an anomalous dispersiveness" is effective for the correction of the chromatic aberration.

As a zoom lens suitable for a higher magnification ratio, there is an already-known configuration such that a first lens group has a positive focal length, a second lens group has a negative focal length, a third lens group has a positive focal length, and a fourth lens group has a positive focal length, in order from the object side, and when changing magnification from the wide-angle end toward the telephoto end, a spacing between the first lens group and the second lens group increases, a spacing between the second lens group and the third lens group decreases, and a spacing between the third lens group and the fourth lens group varies. A zoom lens having such a configuration and using an anomalous dispersiveness is disclosed in the following patent document 1 through the document 3 and so forth.

The zoom lens disclosed in the patent document 1 has 25 degrees of the half angle of view at the wide-angle end in the embodiment disclosed; this cannot answer the demands of recent users in terms of seeking a wider angle. The zoom lens disclosed in the patent document 2 has about 29 to 32 degrees of the half angle of view at the wide-angle end, which cannot be considered as sufficient in terms of a wider angle. The zoom lens disclosed in the patent document 3 has about 37 degrees of the half angle of view at the wide-angle end, which can be recognized as an ample wider angle; however, to achieve this required as many as 14 pieces of lenses in total, and there is conceivably a room for improvement in terms of downsizing (reducing the total length in storage) and reducing the cost.

Patent Document 1: Japanese Patent Laid-Open No.H08-248317

Patent Document 2: Japanese Patent Laid-Open No.2001-194590

Patent Document 3: Japanese Patent Laid-Open No.2004-333768

SUMMARY OF THE INVENTION

The present invention has been made in view of the above circumstances, and provides a high-performance zoom lens suitable for downsizing with as few as 10 to 12 pieces of lenses, which attains a half angle of view over 38 degrees at the wide-angle end, a magnification ratio over 6.5 to 10, and a resolving power corresponding to an imaging element of 5 to 8 million pixels.

The present invention also provides an imaging device having such a zoom lens as a photographing zoom lens, and a personal digital assistant including such an imaging device.

A first aspect of the invention involves a zoom lens for photographing an image of an object including at least a first lens group placed opposite to the object having a positive refracting power, a second lens group placed opposite to the first lens group having a negative refracting power, and a third lens group placed opposite to the second lens group having a positive refracting power, the third lens group having at least a positive lens, when changing magnification from a wide-angle end toward a telephoto end, a spacing between the first lens group and the second lens group increasing, and a spacing between the second lens group and the third lens group decreasing; and the zoom lens having the following features.

Specifically, on an orthogonal two-dimensional coordinate plane taking a partial dispersion ratio $\theta_{g,F}$ defined by the formula: $\theta_{g,F}=(n_g-n_F)/(n_F-n_c)$, whereat $n_g$ is a refractive index to a g line, $n_F$ is a refractive index to an F line, and $n_c$ is a refractive index to a c line, on the vertical axis, and taking an Abbe number $v_d$ on the horizontal axis, when a straight line connecting a coordinate point ($v_d$=60.49, $\theta_{g,F}$=0.5432) of a standard glass type K7 and a coordinate point ($v_d$=36.26, $\theta_{g,F}$=0.5830) of a standard glass type F2 is defined as a standard line, and a deviation of the partial dispersion ratio $\theta_{g,F}$ of the glass type from the standard line on the two-dimensional coordinate plane is defined as an anomalous dispersiveness $\Delta\theta_{g,F}$ of the glass type, a refractive index $N_d$ and the Abbe number $v_d$ and the anomalous dispersiveness $\Delta\theta_{g,F}$ of the positive lens of the third lens group satisfy the following condition (1) through the condition (3).

$$N_d > 1.58 \quad (1)$$

$$v_d > 60.0 \quad (2)$$

$$0.05 > \Delta\theta_{g,F} > 0.003 \quad (3)$$

Preferably, the zoom lens includes an aperture stop between the second lens group and the third lens group, in which at least the first lens group and the third lens group move toward the object side when changing magnification from the wide-angle end toward the telephoto end, in such a manner that the spacing between the first lens group and the second lens group increases and the spacing between the second lens group and the third lens group decreases.

Preferably, the zoom lens includes a fourth lens group on an image side of the third lens group, in which the spacing between the first lens group and the second lens group increases, the spacing between the second lens group and the third lens group decreases, and the spacing between the third lens group and the fourth lens group varies, when changing magnification from the wide-angle end toward the telephoto end; Further in this case, the zoom lens preferably includes an aperture stop between the second lens group and the third lens group, in which at least the first lens group and the third lens group move toward the object side when changing magnification from the wide-angle end toward the telephoto end, in such a manner that the spacing between the first lens group and the second lens group increases, the spacing between the second lens group and the third lens group decreases, and the spacing between the third lens group and the fourth lens group increases.

It is preferable that one piece of positive lens of the third lens group satisfies the condition (1) through the condition (3), and a focal length $f_{ap}$ of the positive lens and a focal length $f_w$ of the whole system at the wide-angle end satisfy the condition (4): $1.0 < f_{ap}/f_w < 2.5$.

It is preferable that the third lens group has at least two pieces of positive lenses and one piece of negative lens, one piece of the positive lenses satisfies the condition (1) through the condition (3), and the other one has an aspherical surface.

It is preferable that a negative lens with a strong concave surface facing toward the image side is disposed on the most image side of the third lens group, and a curvature radius $r_{3R}$ of the lens surface on the image side of the negative lens and the focal length $f_w$ of the whole system at the wide-angle end satisfy the condition (5): $0.8 < |r_{3R}|/f_w < 1.6$.

It is preferable that a whole movement $X_1$ of the first lens group when changing magnification from the wide-angle end toward the telephoto end and a focal length $f_T$ of the whole system at the telephoto end satisfy the condition (6): $0.20 < X_1/f_T < 0.70$; and it is preferable that a whole movement $X_3$ of the third lens group when changing magnification from the wide-angle end toward the telephoto end and the focal length $f_T$ of the whole system at the telephoto end satisfy the condition (7): $0.15 < X_3/f_T < 0.40$.

It is preferable that a focal length $f_2$ of the second lens group and a focal length $f_3$ of the third lens group satisfy the condition (8): $0.45 < |f_2|/f_3 < 0.85$; and it is preferable that a focal length $f_1$ of the first lens group and the focal length $f_w$ of the whole system at the wide-angle end satisfy the condition (9): $5.0 < f_1/f_w < 11.0$.

A second aspect of the present invention involves an imaging device including the above described zoom lens as a photographing zoom lens.

Preferably, the imaging device can be implemented as one that forms an object image by the zoom lens on a light-receiving surface of a color imaging element.

Advantageously, the imaging device is one that uses an imaging element of over 5 to 8 million pixels.

A third aspect of the present invention involves a personal digital assistant including the above described imaging device.

BRIEF DESCRIPTION OF THE DRAWINGS

FIG. 8 is a drawing illustrating the aberration at the short focus end in the embodiment 1;

FIG. 9 is a drawing illustrating the aberration at the medium focal length in the embodiment 1;

DESCRIPTION OF THE PREFERRED EMBODIMENTS

Figure 1:
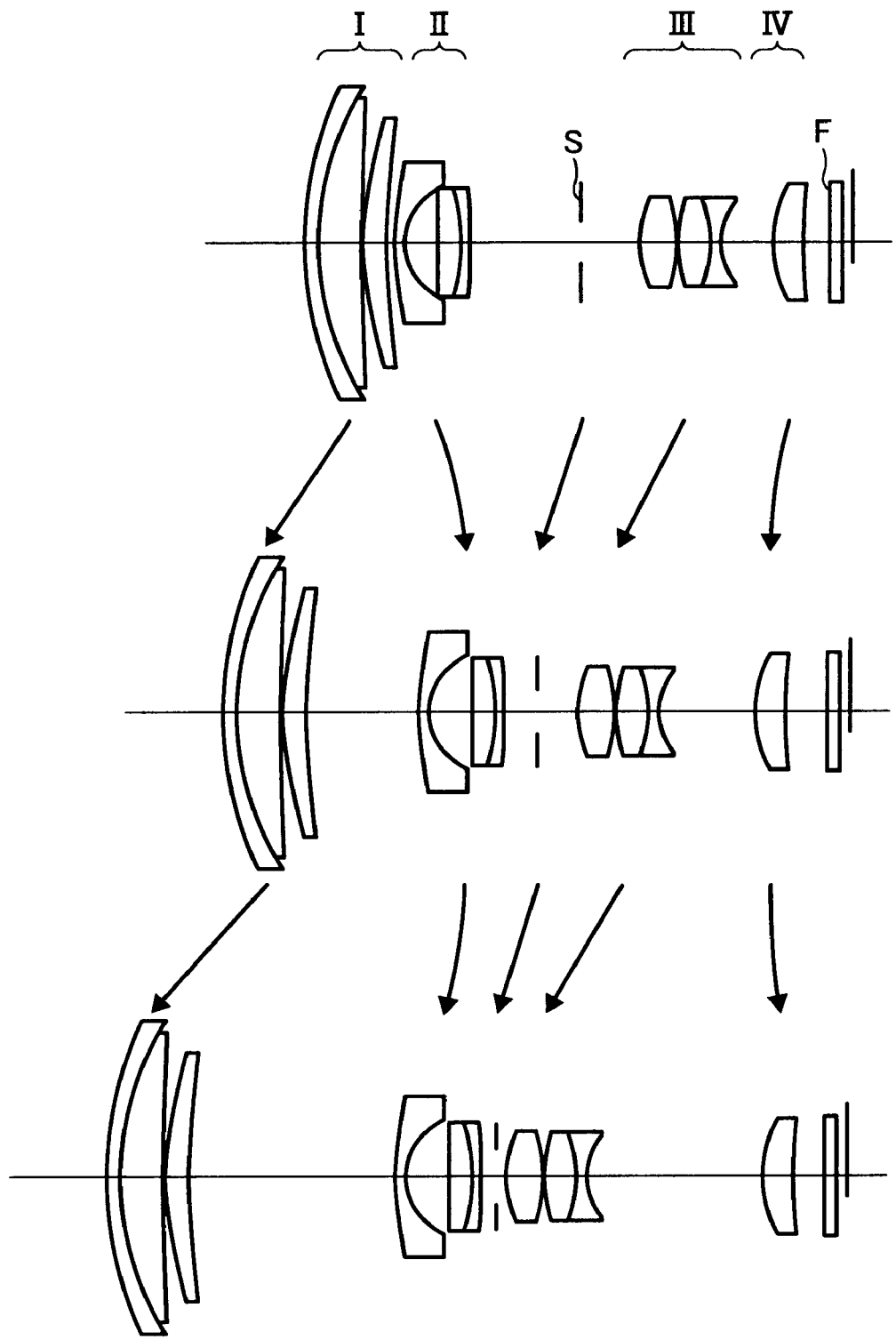
FIG. 1 is a drawing illustrating the configuration of lenses and the movement of each lens group in the embodiment 1.

The preferred embodiments of the zoom lens will be described with the following seven examples. In all of the embodiments, the maximum height of image is 3.70 mm. The embodiment 1 through the embodiment 5 assumes the four group configuration of positive/negative/positive/positive. The embodiment 6 assumes on the three group configuration of positive/negative/positive. And the embodiment 7 assumes the five group configuration of positive/negative/positive/positive/negative.

In each embodiment, a plane parallel plate (denoted by the symbol F in FIG. 1 through FIG. 4) placed on the most image surface side of the zoom lens system is assumedly a cover glass (shield glass) of a light receiving element, such as various filters of an optical low-pass filter and infrared cut filter, etc, and a CCD sensor. The unit of quantity having the dimension of length is mm, unless otherwise specified.

When changing magnification, "all the lens groups" are moved in the embodiment 1 through the embodiment 6, and the first through the fourth lens group are moved in the seventh embodiment; when changing magnification from the wide-angle end toward the telephoto end, the first lens group and the third lens group are moved toward the object side in all of the embodiments 1-7.

The material of the lens is an optical glass in all cases except that the "positive lens of the fourth lens group in the embodiments 1-5, and 7 is an optical plastic".

While achieving a "half angle of view exceeding 38 degrees" at the wide-angle end and a high magnification ratio over 6.5 (embodiment 1: 6.73, embodiment 2: 10.23, embodiment 3: 10.31, embodiment 4: 10.23, embodiment 5: 6.73, embodiment 6: 6.74, embodiment 7: 6.73), the zoom lens in each embodiment corrects the aberrations sufficiently and can be used in combination with a light receiving element of 5-8 million pixels.

Therefore, a configuration of the zoom lens according to the invention will "secure an extremely satisfactory image performance while achieving a sufficient downsizing," which is clear in light of each embodiment.

In each embodiment, the symbols and the meanings thereof are as follows.

f: focal length of the whole system
F: F number
ω: half angle of view
R: curvature radius
D: inter-facial spacing
$N_d$: refractive index
$v_d$: Abbe number
K: conic constant of an aspherical surface
$A_4$: fourth order aspherical coefficient
$A_6$: sixth order aspherical coefficient
$A_8$: eighth order aspherical coefficient
$A_{10}$: tenth order aspherical coefficient
$A_{12}$: twelfth order aspherical coefficient
$A_{14}$: fourteenth order aspherical coefficient
$A_{16}$: sixteenth order aspherical coefficient
$A_{18}$: eighteenth order aspherical coefficient The shape of "aspherical surface" is given by the following well-known formula.

$$X = CH^2/\{1+\sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18}$$

Here, C is the inverse number of paraxial curvature radius (paraxial curvature), H is the height from the optical axis, K is the conic constant, and $A_4$, $A_6$, $A_8$, . . . are the aspherical coefficients.

The optical glasses used are all "manufactured by the OHARA INC.", and the name of the glass type is the trade name of the same company.

Embodiment 1:
f = 4.74-31.93, F = 3.41-5.05, ω = 39.18-6.45

| surface number | R | D | $N_d$ | $v_d$ | $\Delta\theta_{g,F}$ | name of glass type |
|---|---|---|---|---|---|---|
| 01 | 25.418 | 1.00 | 1.92286 | 18.90 | 0.0386 | OHARA S-NPH2 |
| 02 | 19.897 | 3.23 | 1.49700 | 81.54 | 0.0280 | OHARA S-FPL51 |
| 03 | 237.457 | 0.10 | | | | |
| 04 | 26.628 | 1.68 | 1.77250 | 49.60 | −0.0092 | OHARA S-LAH66 |
| 05 | 58.589 | variable (A) | | | | |
| 06* | 18.781 | 0.74 | 1.88300 | 40.76 | −0.0088 | OHARA S-LAH58 |
| 07 | 4.176 | 2.40 | | | | |
| 08 | 236.598 | 1.76 | 1.92286 | 18.90 | 0.0386 | OHARA S-NPH2 |
| 09 | −12.359 | 0.64 | 1.88300 | 40.76 | −0.0088 | OHARA S-LAH58 |
| 10* | 237.126 | variable (B) | | | | |
| 11 | aperture | variable (C) | | | | |
| 12* | 6.982 | 2.70 | 1.58913 | 61.15 | −0.0043 | OHARA L-BAL35 |
| 13* | −9.187 | 0.10 | | | | |
| 14 | 10.085 | 2.33 | 1.60300 | 65.44 | 0.0045 | OHARA S-PHM53 |
| 15 | −8.119 | 0.80 | 1.68893 | 31.07 | 0.0092 | OHARA S-TIM28 |
| 16 | 4.648 | variable (D) | | | | |
| 17* | 8.039 | 2.26 | 1.52470 | 56.20 | | optical plastic |
| 18 | 40.468 | variable (E) | | | | |
| 19 | ∞ | 0.90 | 1.51680 | 64.20 | | various filters |
| 20 | ∞ | | | | | |

Aspherical surface (surface with the mark * added, the same hereunder)

The sixth surface

K = 0.0,
$A_4 = -2.19338 \times 10^{-4}$, $A_6 = 1.13479 \times 10^{-5}$, $A_8 = -2.04849 \times 10^{-6}$,
$A_{10} = 1.56368 \times 10^{-7}$, $A_{12} = -4.98263 \times 10^{-9}$, $A_{14} = 2.89148 \times 10^{-11}$,
$A_{16} = 1.66996 \times 10^{-12}$, $A_{18} = -2.60929 \times 10^{-14}$ The tenth surface K = 0.0,
$A_4 = -6.12409 \times 10^{-4}$, $A_6 = -1.80573 \times 10^{-5}$, $A_8 = 1.51385 \times 10^{-6}$,
$A_{10} = -1.33918 \times 10^{-7}$ The twelfth surface K = 0.0,
$A_4 = -7.52335 \times 10^{-4}$, $A_6 = -1.12417 \times 10^{-5}$, $A_8 = 2.36865 \times 10^{-6}$,
$A_{10} = -2.15147 \times 10^{-7}$ The thirteenth surface K = 0.0,
$A_4 = 2.97351 \times 10^{-4}$, $A_6 = -4.73786 \times 10^{-6}$, $A_8 = 1.28063 \times 10^{-6}$,
$A_{10} = -1.37674 \times 10^{-7}$ The seventeenth surface K = 0.0,
$A_4 = -1.13815 \times 10^{-4}$, $A_6 = 6.21233 \times 10^{-6}$, $A_8 = -1.66452 \times 10^{-7}$,
$A_{10} = 2.78663 \times 10^{-9}$

| | Variables | | |
|---|---|---|---|
| | Short focus end f = 4.742 | medium focal length f = 12.327 | long focus end f = 31.926 |
| A | 0.600 | 8.751 | 15.865 |
| B | 8.157 | 2.664 | 1.150 |

-continued

Embodiment 1:
f = 4.74-31.93, F = 3.41-5.05, ω = 39.18-6.45

| | | | |
|---|---|---|---|
| C | 4.286 | 3.053 | 0.750 |
| D | 3.806 | 6.987 | 12.777 |
| E | 1.954 | 3.085 | 2.365 |

The parameter values of the conditions $f_{ap}/f_w = 1.65$
$|r_{3R}|/f_w = 0.980$
$X_1/f_T = 0.442$
$X_3/f_T = 0.294$
$|f_2|/f_3 = 0.721$
$f_1/f_w = 7.340$
$d_{SW}/f_T = 0.134$ FIG. 1 illustrates the configuration of lens groups of the zoom lens in the embodiment 1, in which the upper drawing shows the configuration at the wide-angle end, the middle drawing shows the configuration at the medium focal length, and the lower drawing shows the configuration at the telephoto end. In the drawing, the symbol "I" signifies the first lens group, the symbol "II" the second lens group, the symbol "III" the third lens group, the symbol "IV" the fourth lens group, and the symbol "S" the aperture stop. And the symbol "F" signifies a piece of transparent plane parallel plate, which represents the cover glass (shield glass) of a light receiving element such as various filters and a CCD sensor, as mentioned above.

The "anomalous dispersive lens" satisfying the condition (1) through the condition (3) is the "positive lens placed at the second position from the aperture stop" of the third lens group.

Figure 10:
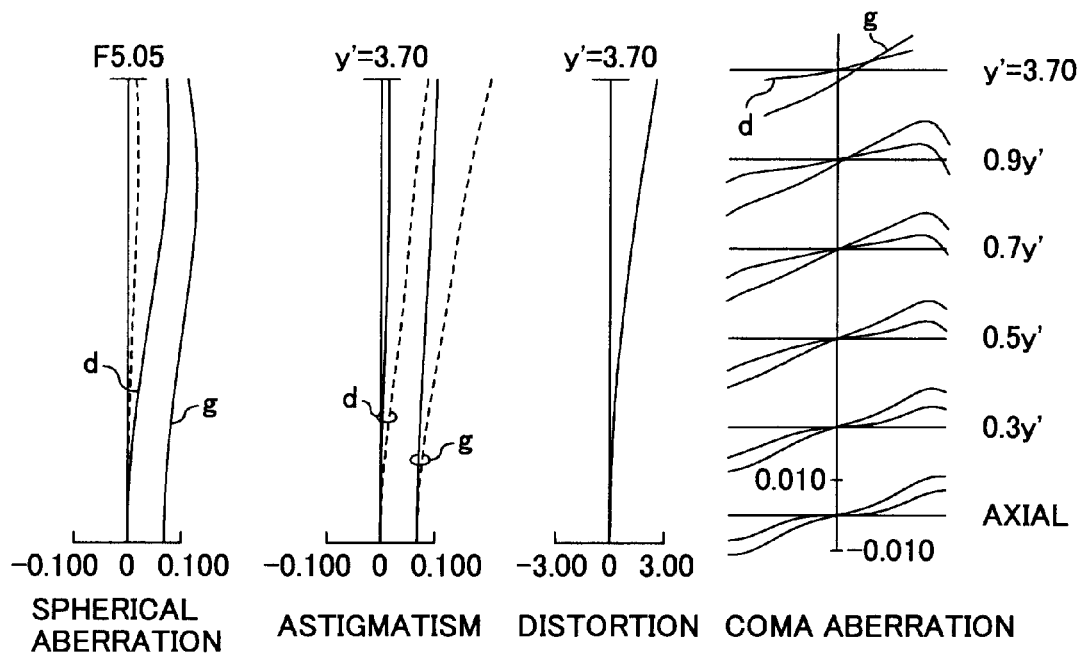
FIG. 10 is a drawing illustrating the aberration at the telephoto end in the embodiment 1.

FIG. 8, FIG. 9, and FIG. 10 illustrate the aberration at the short focus end, the aberration at the medium focal length, and the aberration at the telephoto end, respectively in this order. Here, the dotted line in the drawing of the spherical aberration shows the sine condition; the solid line and dotted line in the drawing of the astigmatism show the sagittal astigmatism and meridional astigmatism, respectively.

Embodiment 2:
f = 4.74-48.47, F = 3.53-5.08, ω = 39.21-4.26

| surface number | R | D | $N_d$ | $v_d$ | $\Delta\theta_{g,F}$ | name of glass type |
|---|---|---|---|---|---|---|
| 01 | 32.205 | 1.00 | 1.84666 | 23.78 | 0.0175 | OHARA S-TIH53 |
| 02 | 22.145 | 3.54 | 1.49700 | 81.54 | 0.0280 | OHARA S-FPL51 |
| 03 | 112.635 | 0.10 | | | | |
| 04 | 25.925 | 2.74 | 1.62041 | 60.29 | −0.0012 | OHARA S-BSM16 |
| 05 | 115.816 | variable (A) | | | | |
| 06* | 24.257 | 0.74 | 1.83481 | 42.71 | −0.0082 | OHARA S-LAH55 |
| 07 | 4.509 | 2.57 | | | | |
| 08 | 46.644 | 2.67 | 1.80518 | 25.42 | 0.0158 | OHARA S-TIH6 |
| 09 | −6.432 | 0.64 | 1.88300 | 40.76 | −0.0088 | OHARA S-LAH58 |
| 10* | 102.556 | variable (B) | | | | |
| 11 | aperture | variable (C) | | | | |
| 12* | 7.725 | 3.31 | 1.58913 | 61.15 | −0.0043 | OHARA L-BAL35 |
| 13* | −9.632 | 0.10 | | | | |
| 14 | 10.161 | 2.36 | 1.60300 | 65.44 | 0.0045 | OHARA S-PHM53 |
| 15 | −7.549 | 0.80 | 1.63980 | 34.47 | 0.0065 | OHARA S-TIM27 |
| 16 | 4.619 | variable (D) | | | | |
| 17 | −25.476 | 1.33 | 1.69895 | 30.13 | 0.0103 | OHARA S-TIM35 |
| 18 | 31.606 | 0.10 | | | | |
| 19* | 9.324 | 2.77 | 1.52470 | 56.20 | | optical plastic |
| 20 | −14.754 | variable (E) | | | | |
| 21 | ∞ | 0.90 | 1.51680 | 64.20 | | various filters |
| 22 | ∞ | | | | | |

Aspherical surface

The sixth surface $K = 0.0$,
$A_4 = -7.42443 \times 10^{-5}$, $A_6 = 1.52472 \times 10^{-6}$, $A_8 = -2.55606 \times 10^{-8}$,
$A_{10} = 7.39898 \times 10^{-11}$ The tenth surface $K = 0.0$,
$A_4 = -4.89544 \times 10^{-4}$, $A_6 = -7.50225 \times 10^{-8}$, $A_8 = -3.31112 \times 10^{-7}$,
$A_{10} = -1.81658 \times 10^{-8}$ The twelfth surface $K = 0.0$,
$A_4 = -7.34491 \times 10^{-4}$, $A_6 = -3.10441 \times 10^{-6}$, $A_8 = 2.22594 \times 10^{-8}$,
$A_{10} = -5.45002 \times 10^{-8}$ The thirteenth surface $K = 0.0$,
$A_4 = 1.33185 \times 10^{-4}$, $A_6 = -4.89508 \times 10^{-6}$, $A_8 = 9.45570 \times 10^{-8}$,
$A_{10} = -3.97335 \times 10^{-8}$ The nineteenth surface $K = 0.0$,
$A_4 = -3.15005 \times 10^{-4}$, $A_6 = 3.37765 \times 10^{-6}$, $A_8 = -1.20761 \times 10^{-7}$,
$A_{10} = 1.16302 \times 10^{-9}$ Variables

| | Short focus end f = 4.739 | medium focal length f = 15.159 | long focus end f = 48.469 |
|---|---|---|---|
| A | 0.679 | 12.708 | 21.200 |
| B | 10.153 | 4.102 | 1.150 |
| C | 4.587 | 1.000 | 0.750 |
| D | 3.000 | 3.138 | 15.588 |
| E | 2.725 | 7.313 | 1.982 |

Figure 2:
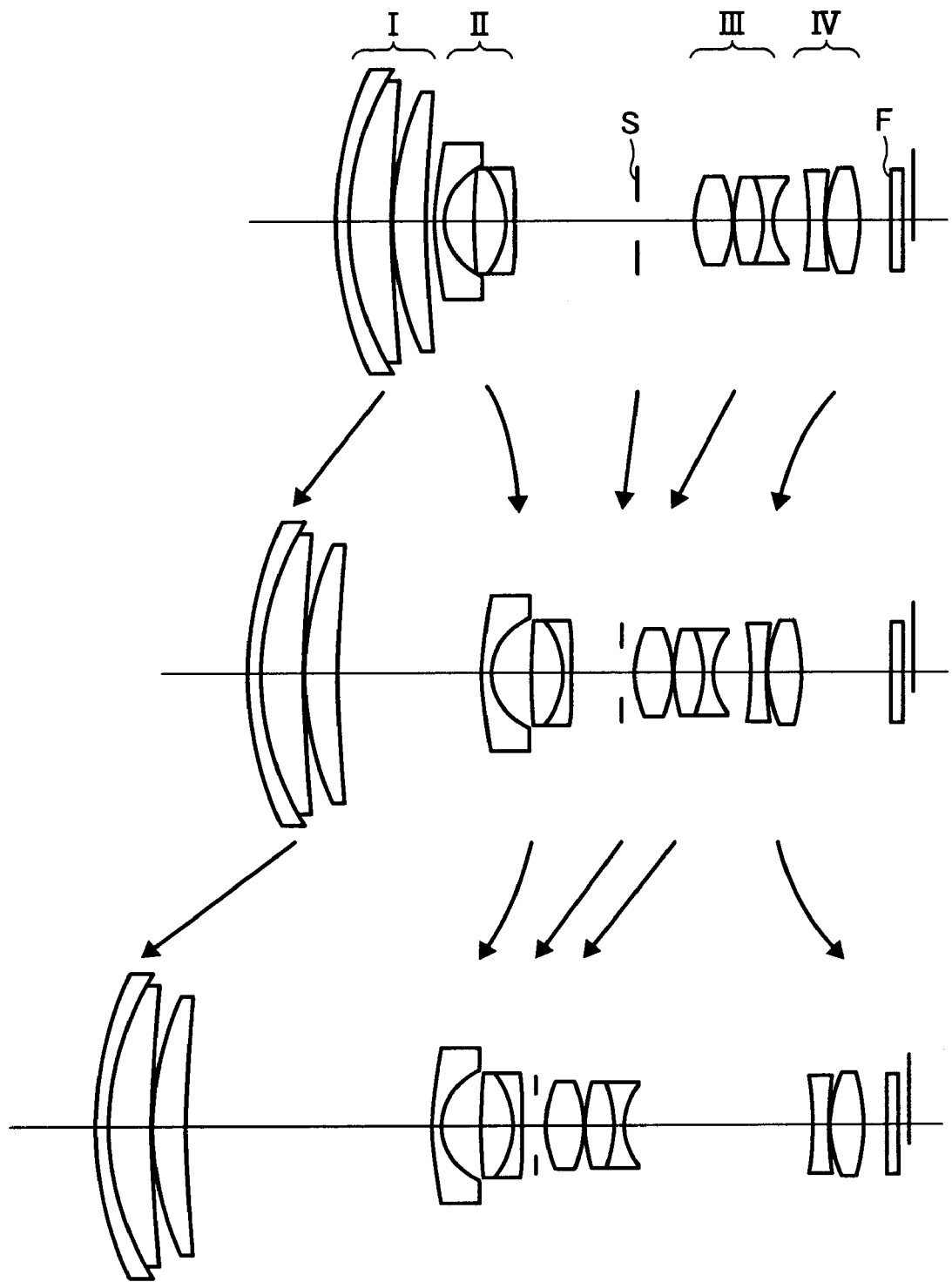
FIG. 2 is a drawing illustrating the configuration of lenses and the movement of each lens group in the embodiment 2.
Figure 11:
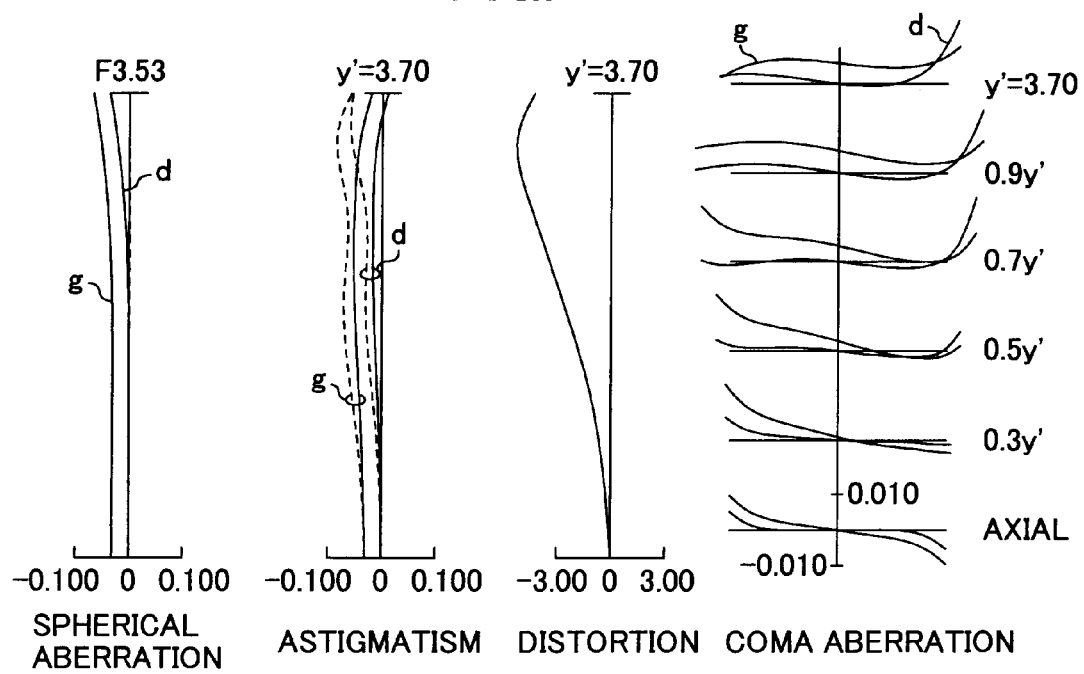
FIG. 11 is a drawing illustrating the aberration at the short focus end in the embodiment 2.
Figure 12:
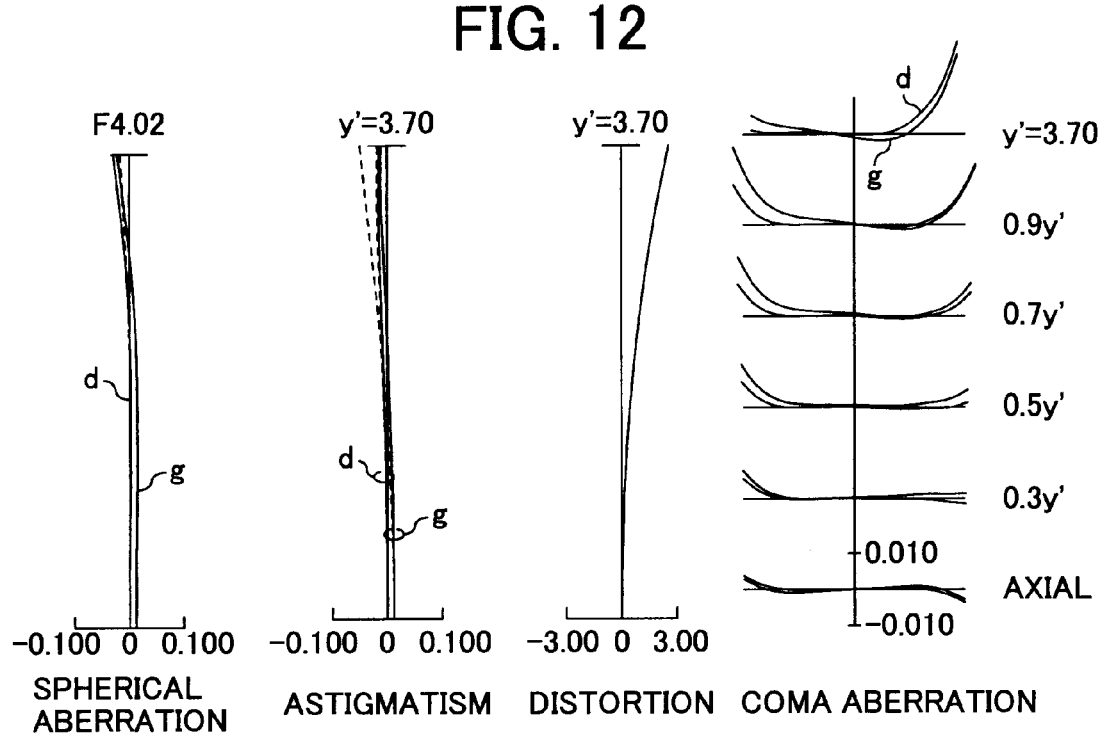
FIG. 12 is a drawing illustrating the aberration at the medium focal length in the embodiment 2.
Figure 13:
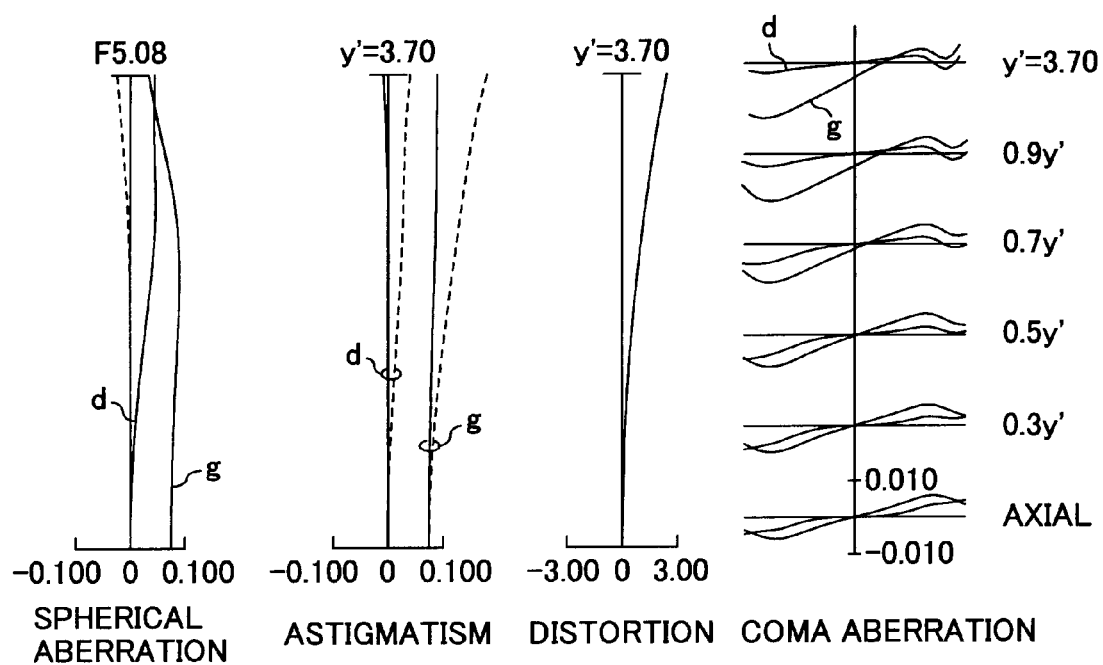
FIG. 13 is a drawing illustrating the aberration at the telephoto end in the embodiment 2.

The parameter values of the conditions $f_{ap}/f_w = 1.60$
$|r_{3R}|/f_w = 0.973$
$X_1/f_T = 0.403$
$X_3/f_T = 0.244$
$|f_2|/f_3 = 0.682$
$f_1/f_w = 8.59$
$d_{SW}/f_T = 0.095$ FIG. 2 illustrates the configuration of lens groups of the zoom lens in the embodiment 2, at the wide-angle end, at the medium focal length, and at the telephoto end, in the same manner as FIG. 1. And, FIG. 11, FIG. 12, and FIG. 13 illustrate the aberration at the short focus end, the aberration at the medium focal length, and the aberration at the telephoto end, respectively in this order.

The anomalous dispersive lens satisfying the condition (1) through the condition (3) is the "positive lens placed at the second position from the aperture stop" of the third lens group.

Embodiment 3:
f = 4.74-48.46, F = 3.46-5.70, ω = 38.93-4.34

| surface number | R | D | $N_d$ | $v_d$ | $\Delta\theta_{g,F}$ | name of glass type |
|---|---|---|---|---|---|---|
| 01 | 36.614 | 1.00 | 1.80518 | 25.42 | 0.0158 | OHARA S-TIH6 |
| 02 | 23.704 | 4.63 | 1.48749 | 70.24 | 0.0022 | OHARA S-FSL5 |

-continued

Embodiment 3:
f = 4.74-48.46, F = 3.46-5.70, ω = 38.93-4.34

| | | | | | | |
|---|---|---|---|---|---|---|
| 03 | −266.625 | 0.10 | | | | |
| 04 | 18.072 | 3.18 | 1.48749 | 70.24 | 0.0022 | OHARA S-FSL5 |
| 05 | 39.894 | variable (A) | | | | |
| 06* | 49.751 | 0.74 | 1.88300 | 40.76 | −0.0088 | OHARA S-LAH58 |
| 07 | 4.671 | 2.38 | | | | |
| 08 | 43.227 | 2.82 | 1.80518 | 25.42 | 0.0158 | OHARA S-TIH6 |
| 09 | −6.015 | 0.64 | 1.88300 | 40.76 | −0.0088 | OHARA S-LAH58 |
| 10* | −391.116 | variable (B) | | | | |
| 11 | aperture | variable (C) | | | | |
| 12* | 7.481 | 2.65 | 1.58913 | 61.15 | −0.0043 | OHARA L-BAL35 |
| 13* | −11.439 | 0.10 | | | | |
| 14 | 15.952 | 2.40 | 1.61800 | 63.33 | 0.0051 | OHARA S-PHM52 |
| 15 | −5.186 | 0.80 | 1.61293 | 37.00 | 0.0046 | OHARA S-TIM3 |
| 16 | 5.186 | variable (D) | | | | |
| 17 | 10.352 | 0.50 | 1.84666 | 23.78 | 0.0175 | OHARA S-TIH53 |
| 18 | 7.598 | 0.10 | | | | |
| 19* | 7.406 | 3.31 | 1.52470 | 56.20 | | optical plastic |
| 20 | −43.753 | variable (E) | | | | |
| 21 | ∞ | 0.90 | 1.51680 | 64.20 | | various filters |
| 22 | ∞ | | | | | |

Aspherical surface

The sixth surface

K = 0.0,
$A_4 = 4.68067 \times 10^{-5}, A_6 = 6.87101 \times 10^{-7}, A_8 = -2.85890 \times 10^{-8}$,
$A_{10} = 1.31219 \times 10^{-10}$ The tenth surface K = 0.0,
$A_4 = -4.22453 \times 10^{-4}, A_6 = 5.67023 \times 10^{-7}, A_8 = -3.33952 \times 10^{-7}$,
$A_{10} = -1.38989 \times 10^{-8}$ The twelfth surface K = 0.0,
$A_4 = -6.36669 \times 10^{-4}, A_6 = -8.20604 \times 10^{-7}, A_8 = 4.09961 \times 10^{-7}$,
$A_{10} = -3.95066 \times 10^{-8}$ The thirteenth surface K = 0.0,
$A_4 = 1.88071 \times 10^{-4}, A_6 = -4.02370 \times 10^{-6}, A_8 = 7.11201 \times 10^{-7}$,
$A_{10} = -3.87131 \times 10^{-8}$ The nineteenth surface K = 0.0,
$A_4 = -4.98249 \times 10^{-5}, A_6 = 3.29106 \times 10^{-7}, A_8 = 2.23225 \times 10^{-8}$,
$A_{10} = -1.44572 \times 10^{-9}$ Variables

| | Short focus end f = 4.738 | medium focal length f = 15.164 | long focus end f = 48.458 |
|---|---|---|---|
| A | 0.600 | 9.610 | 20.600 |
| B | 10.188 | 3.077 | 1.150 |
| C | 4.094 | 1.007 | 0.750 |
| D | 3.500 | 5.126 | 18.208 |
| E | 3.334 | 8.719 | 4.282 |

Figure 3:
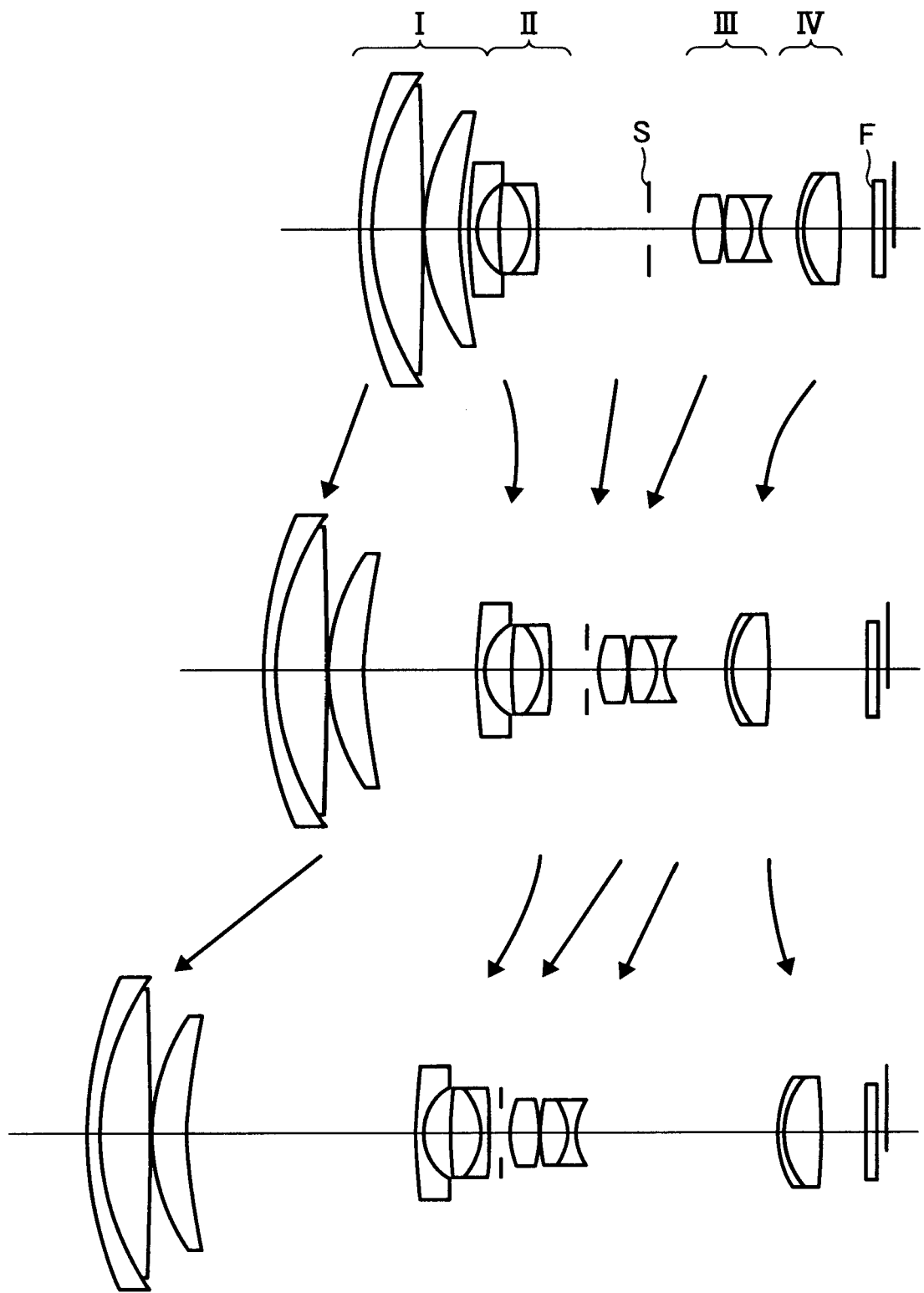
FIG. 3 is a drawing illustrating the configuration of lenses and the movement of each lens group in the embodiment 3.
Figure 14:
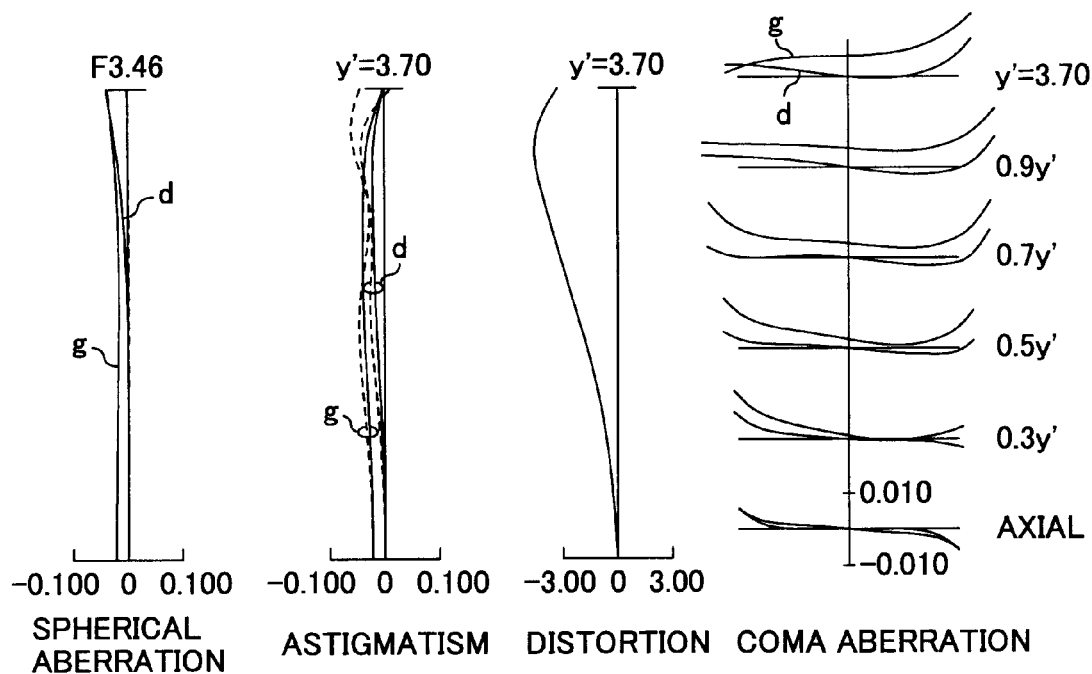
FIG. 14 is a drawing illustrating the aberration at the short focus end in the embodiment 3.
Figure 15:
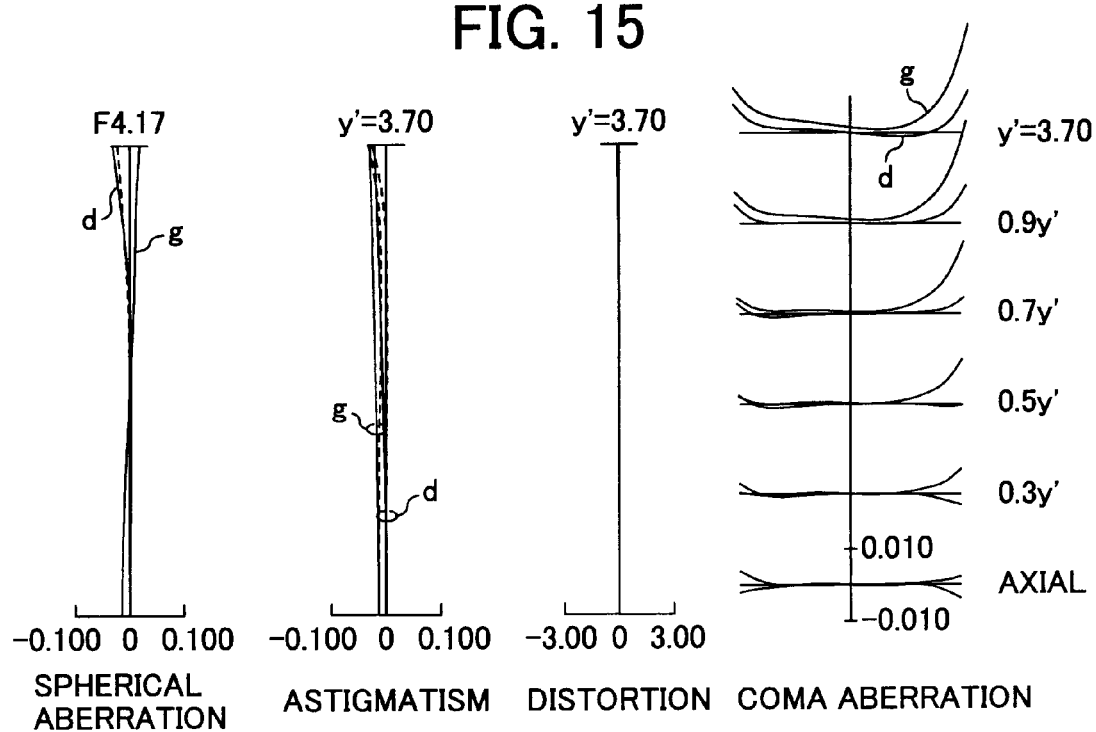
FIG. 15 is a drawing illustrating the aberration at the medium focal length in the embodiment 3.
Figure 16:
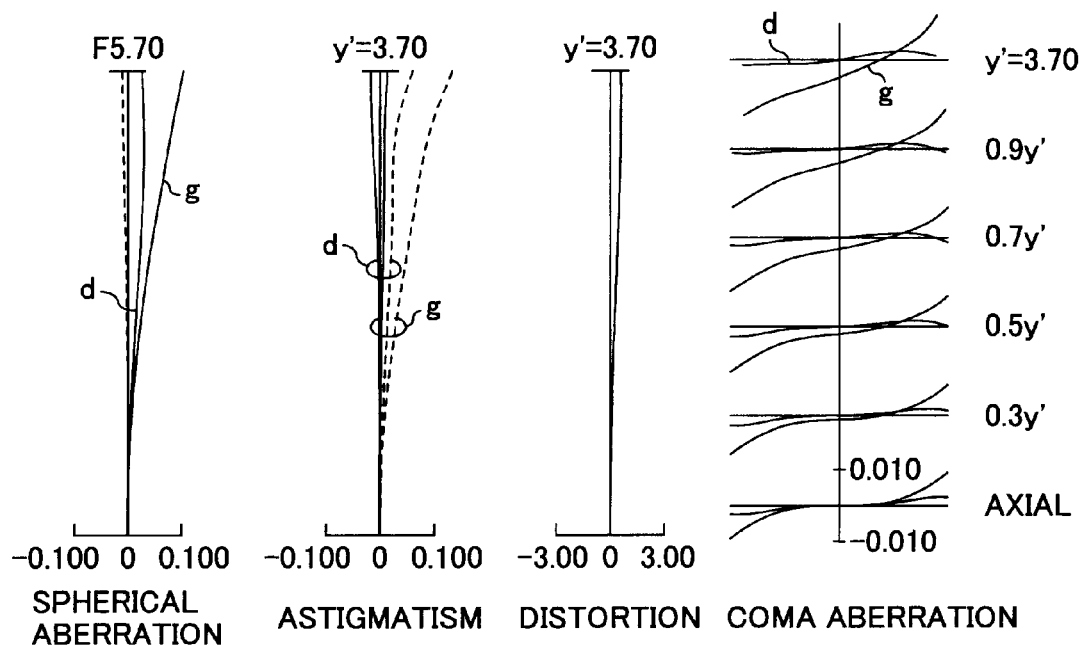
FIG. 16 is a drawing illustrating the aberration at the telephoto end in the embodiment 3.

The parameter values of the conditions $f_{ap}/f_w = 1.39$
$|r_{3R}|/f_w = 1.09$
$X_1/f_T = 0.480$
$X_3/f_T = 0.323$
$|f_2|/f_3 = 0.581$
$f_1/f_w = 8.24$
$d_{SW}/f_T = 0.084$ FIG. 3 illustrates the configuration of lens groups of the zoom lens in the embodiment 3, at the wide-angle end, at the medium focal length, and at the telephoto end, in the same manner as FIG. 1. And, FIG. 14, FIG. 15, and FIG. 16 illustrate the aberration at the short focus end, the aberration at the medium focal length, and the aberration at the telephoto end, respectively in this order.

The anomalous dispersive lens satisfying the condition (1) through the condition (3) is the "positive lens placed at the second position from the aperture stop" of the third lens group.

Embodiment 4:
f = 4.74-48.48, F = 3.48-5.01, ω = 39.22-4.25

| surface number | R | D | $N_d$ | $v_d$ | $\Delta\theta_{g,F}$ | name of glass type |
|---|---|---|---|---|---|---|
| 01 | 45.073 | 1.00 | 1.84666 | 23.78 | 0.0175 | OHARA S-TIH53 |
| 02 | 29.498 | 3.62 | 1.45600 | 90.29 | 0.0386 | OHARA S-FPL52 |
| 03 | ∞ | 0.10 | | | | |
| 04 | 33.276 | 2.62 | 1.69680 | 55.53 | −0.0082 | OHARA S-LAL14 |
| 05 | 187.238 | variable (A) | | | | |
| 06 | 50.110 | 0.74 | 1.88300 | 40.76 | −0.0088 | OHARA S-LAH58 |
| 07 | 5.219 | 2.36 | | | | |
| 08 | 59.100 | 2.92 | 1.78470 | 26.29 | 0.0146 | OHARA S-TIH23 |
| 09 | −6.401 | 0.64 | 1.88300 | 40.76 | −0.0092 | OHARA S-LAH58 |
| 10* | −51.678 | variable (B) | | | | |
| 11 | aperture | variable (C) | | | | |
| 12* | 7.614 | 2.61 | 1.58913 | 61.15 | −0.0043 | OHARA L-BAL35 |
| 13 | −22.027 | 0.43 | | | | |
| 14 | 12.944 | 1.03 | 1.76200 | 40.10 | −0.0001 | OHARA S-LAM55 |
| 15 | 4.170 | 3.06 | 1.60300 | 65.44 | 0.0045 | OHARA S-PHM53 |
| 16 | −24.855 | 0.10 | | | | |
| 17 | 104.241 | 1.45 | 1.68893 | 31.07 | 0.0092 | OHARA S-TIM28 |
| 18* | 6.050 | variable (D) | | | | |
| 19* | 7.731 | 2.06 | 1.52470 | 56.20 | | optical plastic |
| 20 | 15.935 | variable (E) | | | | |
| 21 | ∞ | 0.90 | 1.51680 | 64.20 | | various filters |
| 22 | ∞ | | | | | |

Aspherical surface

The tenth surface

K = 0.0,
$A_4 = -3.36309 \times 10^{-4}, A_6 = -1.04662 \times 10^{-6}, A_8 = -2.09664 \times 10^{-7}$,
$A_{10} = 1.11152 \times 10^{-9}$ The fourteenth surface K = 0.0,
$A_4 = -4.24292 \times 10^{-4}, A_6 = 1.25661 \times 10^{-7}, A_8 = -2.90899 \times 10^{-7}$,
$A_{10} = 1.00842 \times 10^{-8}$ The fifteenth surface K = 0.0,
$A_4 = 4.43764 \times 10^{-4}, A_6 = 1.39228 \times 10^{-5}, A_8 = -8.27433 \times 10^{-7}$,
$A_{10} = -5.12212 \times 10^{-8}$ The nineteenth surface K = 0.0,
$A_4 = -4.52445 \times 10^{-5}, A_6 = 6.53780 \times 10^{-6}, A_8 = -3.16498 \times 10^{-7}$,
$A_{10} = 8.54289 \times 10^{-9}$ Variables

| | Short focus end f = 4.737 | medium focal length f = 15.153 | long focus end f = 48.481 |
|---|---|---|---|
| A | 0.700 | 13.313 | 24.548 |
| B | 10.934 | 5.665 | 1.150 |
| C | 7.570 | 1.727 | 0.500 |
| D | 3.671 | 7.035 | 14.783 |
| E | 2.219 | 4.452 | 2.316 |

The values of parameters of the conditions $f_{ap}/f_w = 1.30$
$|r_{3R}|/f_w = 1.28$ -continued Embodiment 4:
f = 4.74-48.48, F = 3.48-5.01, ω = 39.22-4.25

$X_1/f_T = 0.381$
$X_3/f_T = 0.231$
$|f_2|/f_3 = 0.727$
$f_1/f_w = 9.33$
$d_{SW}/f_T = 0.156$

Figure 4:
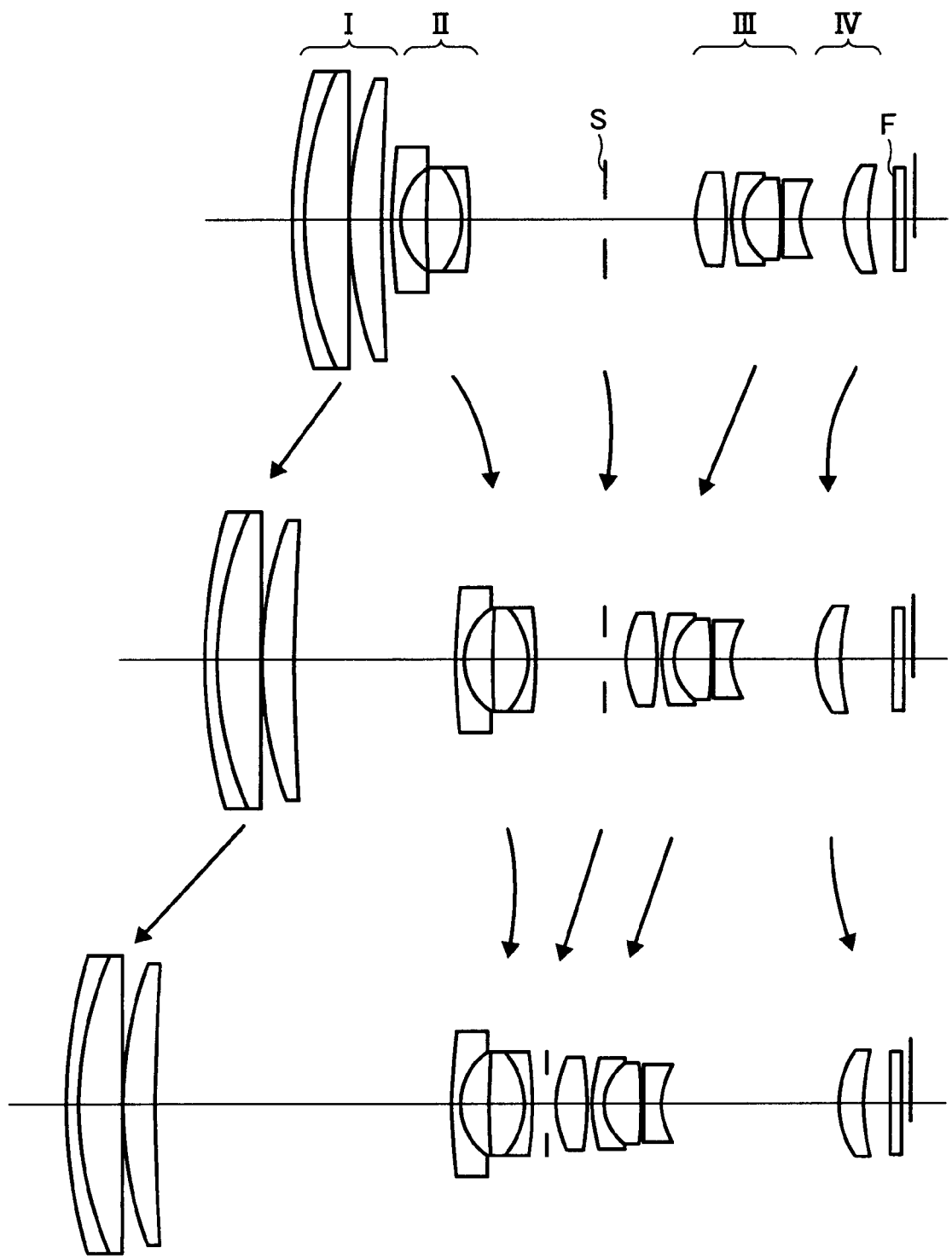
FIG. 4 is a drawing illustrating the configuration of lenses and the movement of each lens group in the embodiment 4.
Figure 17:
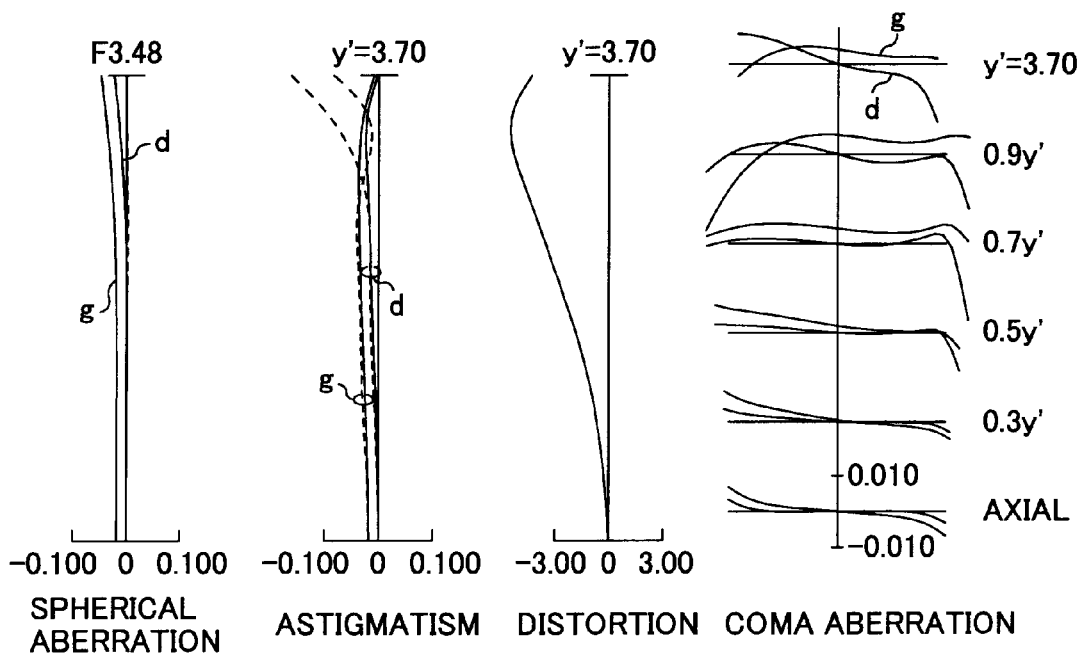
FIG. 17 is a drawing illustrating the aberration at the short focus end in the embodiment 4.
Figure 18:
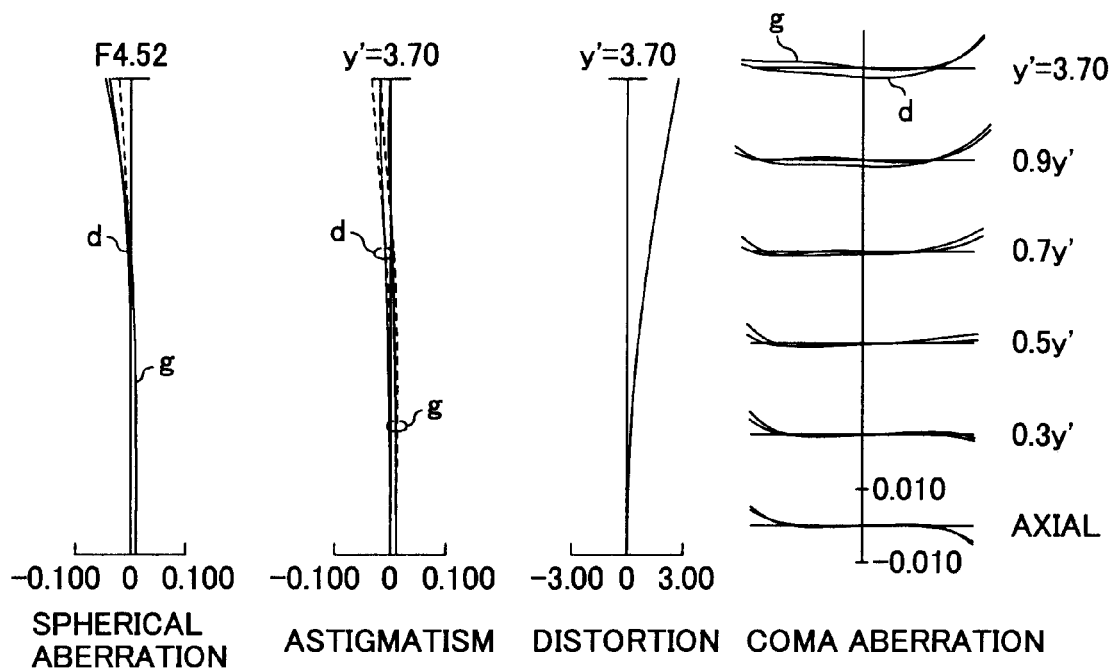
FIG. 18 is a drawing illustrating the aberration at the medium focal length in the embodiment 4.
Figure 19:
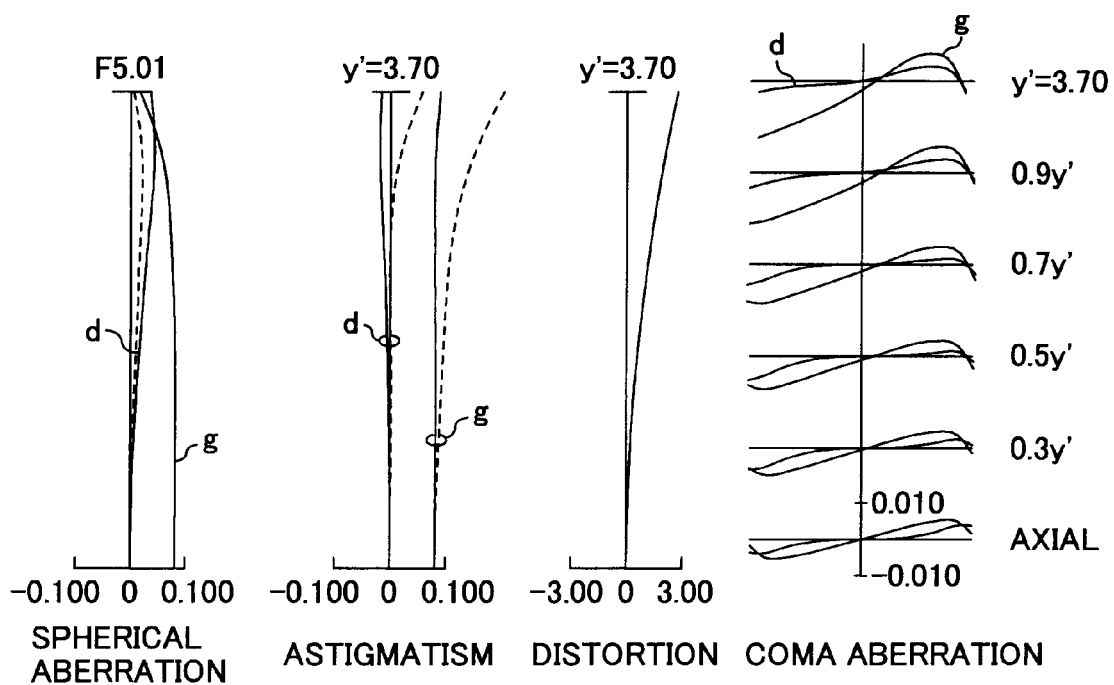
FIG. 19 is a drawing illustrating the aberration at the telephoto end in the embodiment 4.

FIG. 4 illustrates the configuration of lens groups of the zoom lens in the embodiment 4, at the wide-angle end, at the medium focal length, and at the telephoto end, in the same manner as FIG. 1. And, FIG. 17, FIG. 18, and FIG. 19 illustrate the aberration at the short focus end, the aberration at the medium focal length, and the aberration at the telephoto end, respectively in this order.

The anomalous dispersive lens satisfying the condition (1) through the condition (3) is the "positive lens placed at the third position from the aperture stop" of the third lens group.

Embodiment 5:
f = 4.74-31.90, F = 3.51-5.58, ω = 39.19-6.48

| surface number | R | D | $N_d$ | $v_d$ | $\Delta\theta_{g,F}$ | name of glass type |
|---|---|---|---|---|---|---|
| 01 | 36.647 | 1.00 | 1.92286 | 18.90 | 0.0386 | OHARA S-NPH2 |
| 02 | 23.427 | 2.74 | 1.60300 | 65.44 | 0.0045 | OHARA S-PHM53 |
| 03 | 170.952 | 0.10 | | | | |
| 04 | 18.584 | 2.31 | 1.77250 | 49.60 | −0.0092 | OHARA S-LAH66 |
| 05 | 47.492 | variable (A) | | | | |
| 06* | 39.987 | 0.74 | 1.88300 | 40.76 | −0.0088 | OHARA S-LAH58 |
| 07 | 4.234 | 2.32 | | | | |
| 08 | 54.221 | 2.05 | 1.92286 | 18.90 | 0.0386 | OHARA S-NPH2 |
| 09 | −9.272 | 0.84 | 2.00330 | 28.27 | 0.0023 | OHARA S-LAH79 |
| 10* | −116.917 | variable (B) | | | | |
| 11 | aperture | variable (C) | | | | |
| 12* | 6.918 | 3.21 | 1.58913 | 61.15 | −0.0043 | OHARA L-BAL35 |
| 13* | −8.678 | 0.10 | | | | |
| 14 | 11.511 | 2.18 | 1.60300 | 65.44 | 0.0045 | OHARA S-PHM53 |
| 15 | −7.770 | 0.60 | 1.68893 | 31.07 | 0.0092 | OHARA S-TIM28 |
| 16 | 4.825 | variable (D) | | | | |
| 17* | 9.227 | 2.02 | 1.52470 | 56.20 | 0.0092 | optical plastic |
| 18 | 158.590 | variable (E) | | | | |
| 19 | ∞ | 0.90 | 1.51680 | 64.20 | | various filters |
| 20 | ∞ | | | | | |

Aspherical surface

The sixth surface

K = 0.0,
$A_4 = 5.31992 \times 10^{-5}$, $A_6 = 2.13225 \times 10^{-7}$, $A_8 = -6.80433 \times 10^{-8}$,
$A_{10} = 9.10866 \times 10^{-10}$ The tenth surface K = 0.0,
$A_4 = -4.66740 \times 10^{-4}$, $A_6 = -3.74622 \times 10^{-7}$, $A_8 = -7.91115 \times 10^{-7}$,
$A_{10} = -2.92852 \times 10^{-8}$ The twelfth surface K = 0.0,
$A_4 = -8.82834 \times 10^{-4}$, $A_6 = -8.96856 \times 10^{-7}$, $A_8 = -4.79181 \times 10^{-8}$,
$A_{10} = -7.50342 \times 10^{-8}$ -continued Embodiment 5:
f = 4.74-31.90, F = 3.51-5.58, ω = 39.19-6.48

The thirteenth surface

K = 0.0,
$A_4 = 3.01624 \times 10^{-4}$, $A_6 = -4.31357 \times 10^{-6}$, $A_8 = 1.38650 \times 10^{-7}$,
$A_{10} = -6.81860 \times 10^{-8}$ The seventeenth surface K = 0.0,
$A_4 = -6.18571 \times 10^{-5}$, $A_6 = 7.90738 \times 10^{-6}$, $A_8 = -3.31121 \times 10^{-7}$,
$A_{10} = 7.16443 \times 10^{-9}$

| Variables | | | |
|---|---|---|---|
| | Short focus end f = 4.741 | medium focal length f = 12.319 | long focus end f = 31.905 |
| A | 0.600 | 7.561 | 14.139 |
| B | 8.107 | 1.621 | 1.000 |
| C | 4.464 | 3.819 | 0.650 |
| D | 3.496 | 6.384 | 11.507 |
| E | 2.855 | 4.192 | 2.352 |

Figure 5:
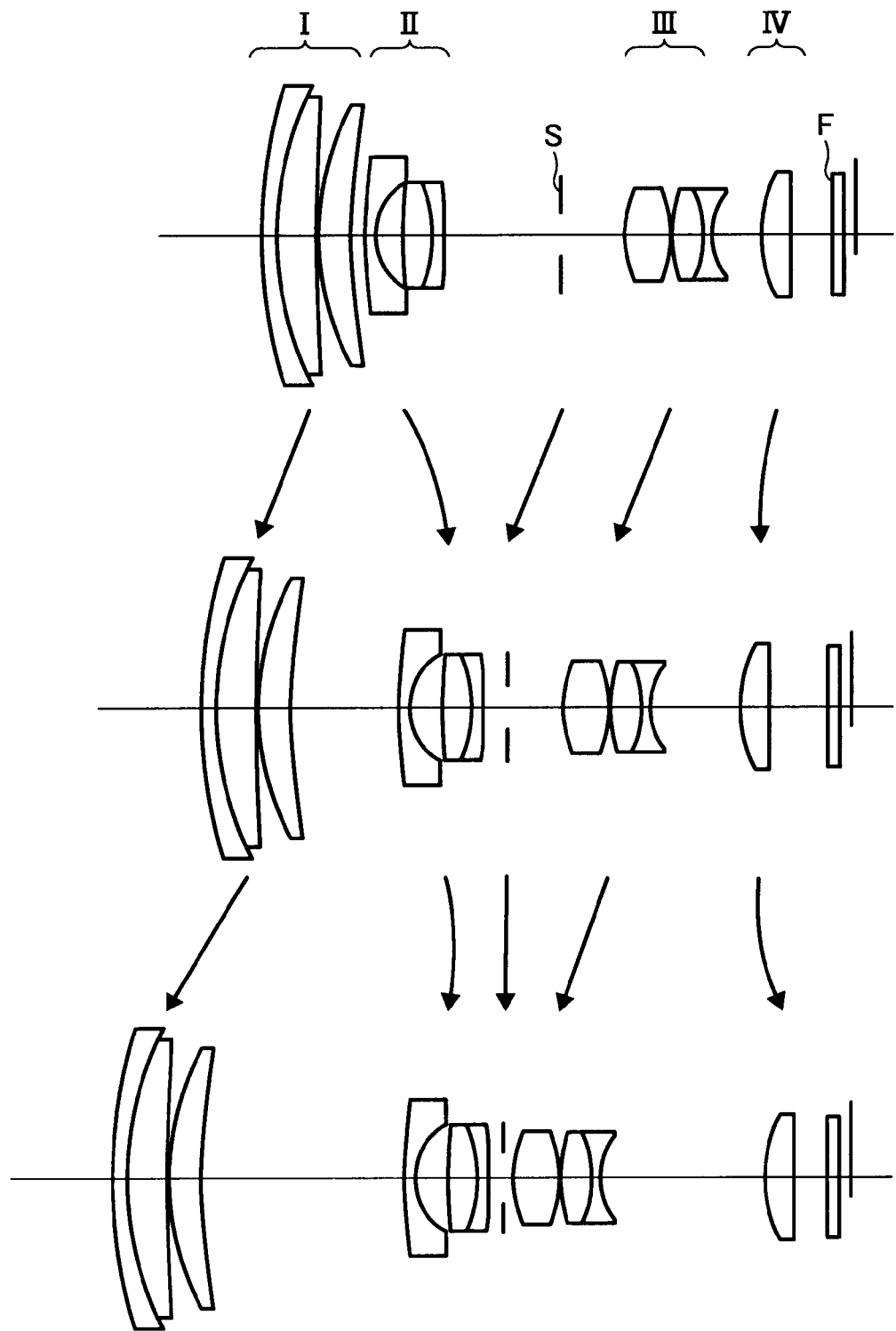
FIG. 5 is a drawing illustrating the configuration of lenses and the movement of each lens group in the embodiment 5.
Figure 20:
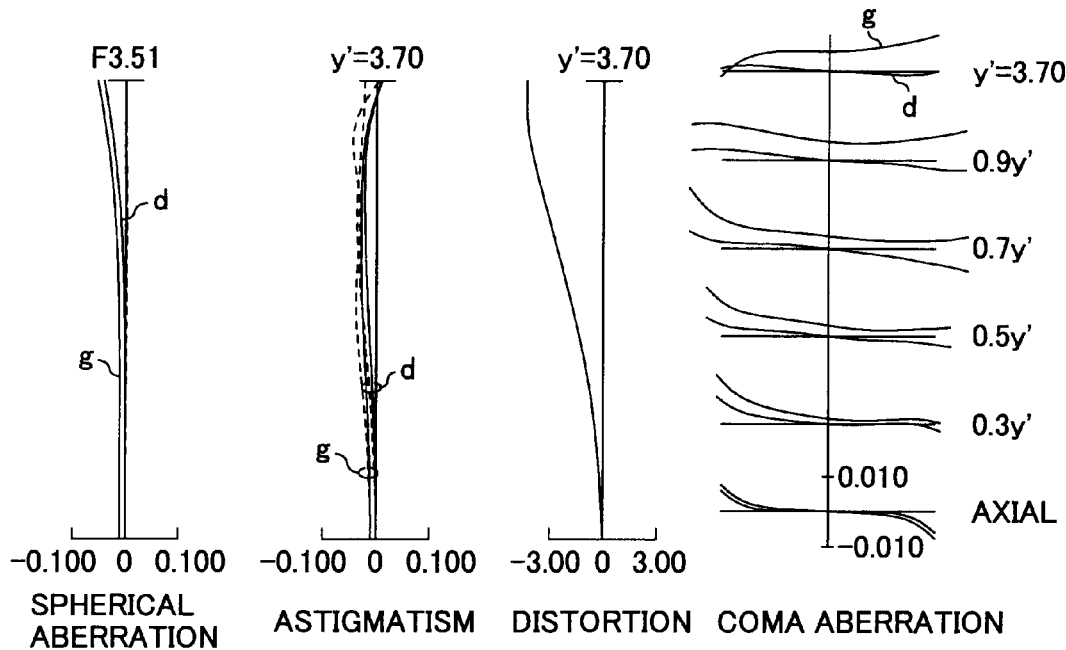
FIG. 20 is a drawing illustrating the aberration at the short focus end in the embodiment 5.
Figure 21:
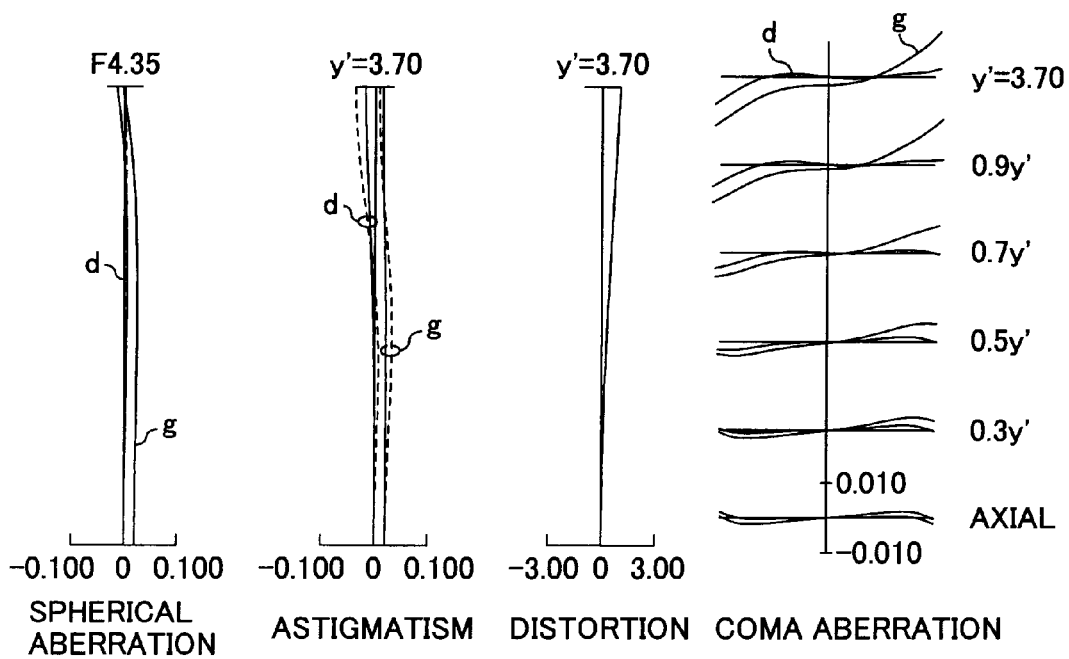
FIG. 21 is a drawing illustrating the aberration at the medium focal length in the embodiment 5.
Figure 22:
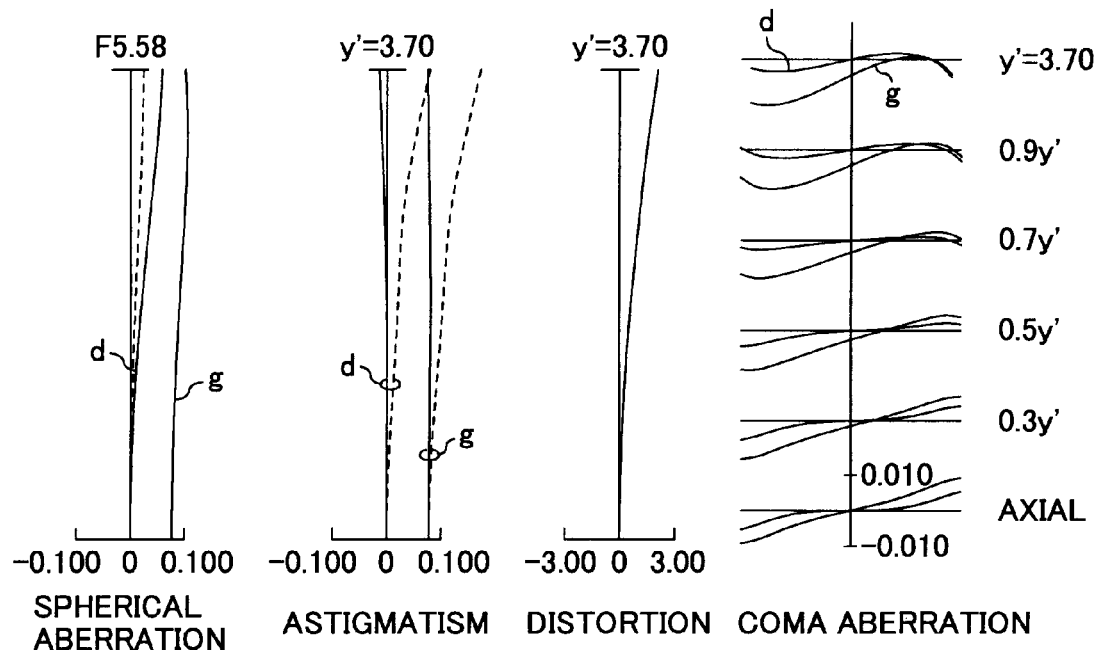
FIG. 22 is a drawing illustrating the aberration at the telephoto end in the embodiment 5.

The values of parameters of the conditions $f_{ap}/f_w = 1.73$
$|r_{3R}|/f_w = 1.02$
$X_1/f_T = 0.317$
$X_3/f_T = 0.235$
$|f_2|/f_3 = 0.664$
$f_1/f_w = 6.25$
$d_{SW}/f_T = 0.140$ FIG. 5 illustrates the configuration of lens groups of the zoom lens in the embodiment 5, at the wide-angle end, at the medium focal length, and at the telephoto end, in the same manner as FIG. 1. And, FIG. 20, FIG. 21, and FIG. 22 illustrate the aberration at the short focus end, the aberration at the medium focal length, and the aberration at the telephoto end, respectively in this order.

The anomalous dispersive lens satisfying the condition (1) through the condition (3) is the "positive lens placed at the second position from the aperture stop" of the third lens group.

Embodiment 6:
f = 4.74-31.93, F = 3.50-5.60, ω = 39.15-6.61

| surface number | R | D | $N_d$ | $v_d$ | $\Delta\theta_{g,F}$ | name of glass type |
|---|---|---|---|---|---|---|
| 01 | 33.024 | 1.00 | 1.92286 | 18.90 | 0.0386 | OHARA S-NPH2 |
| 02 | 21.553 | 3.05 | 1.60300 | 65.44 | 0.0045 | OHARA S-PHM53 |
| 03 | 216.852 | 0.10 | | | | |
| 04 | 16.154 | 2.12 | 1.77250 | 49.60 | −0.0092 | OHARA S-LAH66 |
| 05 | 32.210 | variable (A) | | | | |
| 06* | 22.714 | 0.74 | 1.88300 | 40.76 | −0.0088 | OHARA S-LAH58 |
| 07 | 3.740 | 2.23 | | | | |
| 08 | 118.867 | 2.02 | 1.92286 | 18.90 | 0.0386 | OHARA S-NPH2 |
| 09 | −6.916 | 0.64 | 2.00330 | 28.27 | 0.0023 | OHARA S-LAH79 |
| 10* | −147.074 | variable (B) | | | | |
| 11 | aperture | variable (C) | | | | |
| 12* | 6.119 | 3.11 | 1.58913 | 61.15 | −0.0043 | OHARA L-BAL35 |
| 13* | −9.815 | 0.10 | | | | |
| 14 | 212.627 | 2.26 | 1.60300 | 65.44 | 0.0045 | OHARA S-PHM53 |

-continued

Embodiment 6:
f = 4.74-31.93, F = 3.50-5.60, ω = 39.15-6.61

| | | | | | |
|---|---|---|---|---|---|
| 15 | −6.580 | 0.60 | 1.74950 | 35.28 | 0.0025 OHARA S-LAM7 |
| 16 | 5.405 | 0.77 | | | |
| 17* | 7.011 | 2.11 | 1.51633 | 61.14 | −0.0024 optical plastic |
| 18 | −14.308 | variable (D) | | | |
| 19 | ∞ | 0.90 | 1.51680 | 64.20 | various filters |
| 20 | ∞ | | | | |

Aspherical surface

The sixth surface

K = 0.0,
$A_4 = -1.39130 \times 10^{-5}, A_6 = 1.07909 \times 10^{-6}, A_8 = -9.56983 \times 10^{-8}$,
$A_{10} = 1.01099 \times 10^{-9}$
The tenth surface K = 0.0,
$A_4 = -6.53461 \times 10^{-4}, A_6 = -6.32795 \times 10^{-6}, A_8 = -1.30334 \times 10^{-6}$,
$A_{10} = -7.51258 \times 10^{-8}$
The twelfth surface K = 0.0,
$A_4 = -7.01992 \times 10^{-4}, A_6 = -7.85945 \times 10^{-6}, A_8 = 6.92903 \times 10^{-7}$,
$A_{10} = -9.48794 \times 10^{-8}$
The thirteenth surface K = 0.0,
$A_4 = 2.91193 \times 10^{-4}, A_6 = 1.44347 \times 10^{-6}, A_8 = 2.75419 \times 10^{-7}$,
$A_{10} = -7.93114 \times 10^{-8}$
The seventeenth surface K = 0.0,
$A_4 = -3.23395 \times 10^{-4}, A_6 = -3.74585 \times 10^{-6}, A_8 = 5.42386 \times 10^{-7}$,
$A_{10} = -1.33173 \times 10^{-8}$ Variables

| | Short focus end f = 4.739 | medium focal length f = 12.319 | long focus end f = 31.926 |
|---|---|---|---|
| A | 0.600 | 6.953 | 13.174 |
| B | 6.892 | 4.227 | 1.000 |
| C | 6.193 | 1.668 | 0.650 |
| D | 7.514 | 11.575 | 14.663 |

Figure 6:
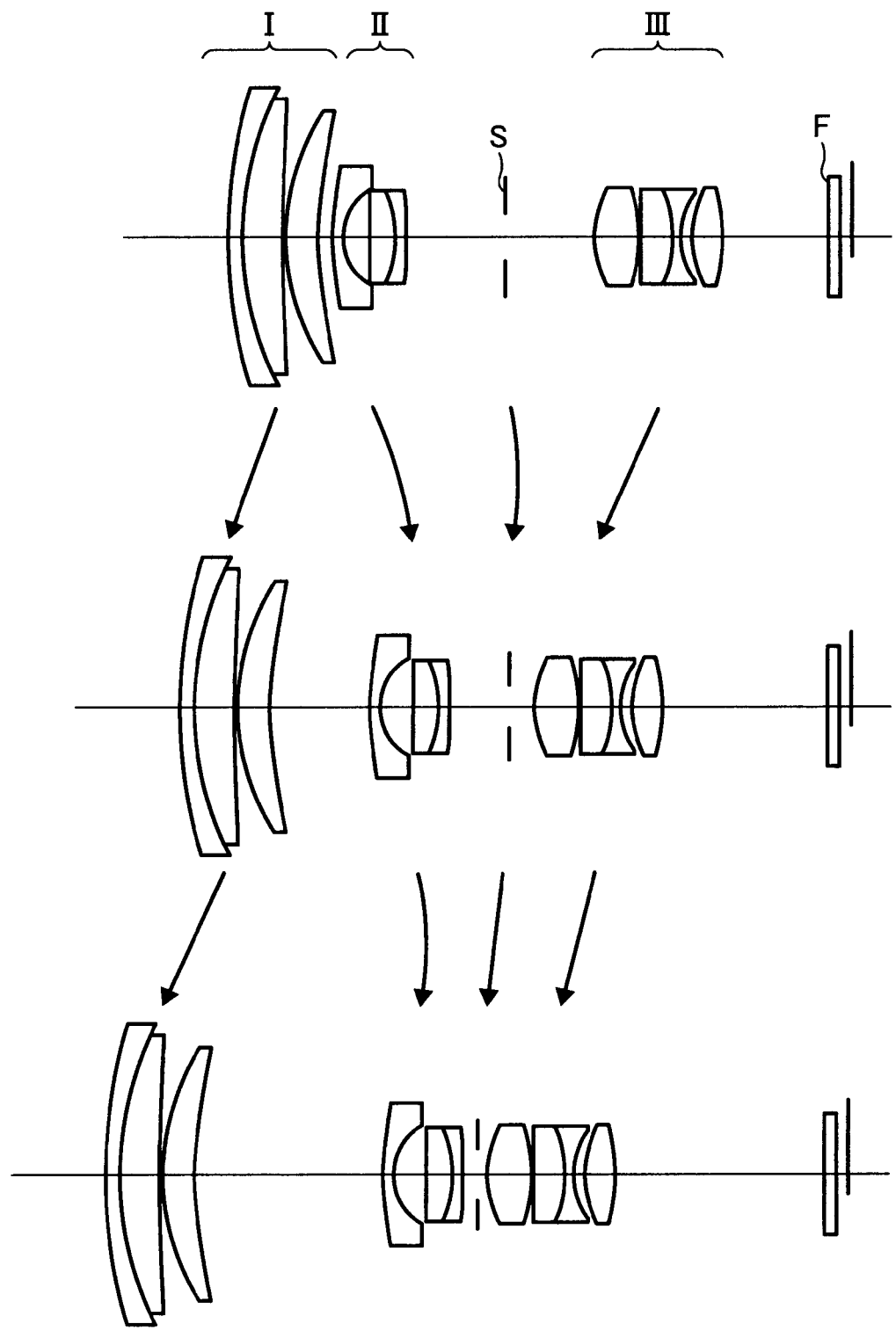
FIG. 6 is a drawing illustrating the configuration of lenses and the movement of each lens group in the embodiment 6.
Figure 23:
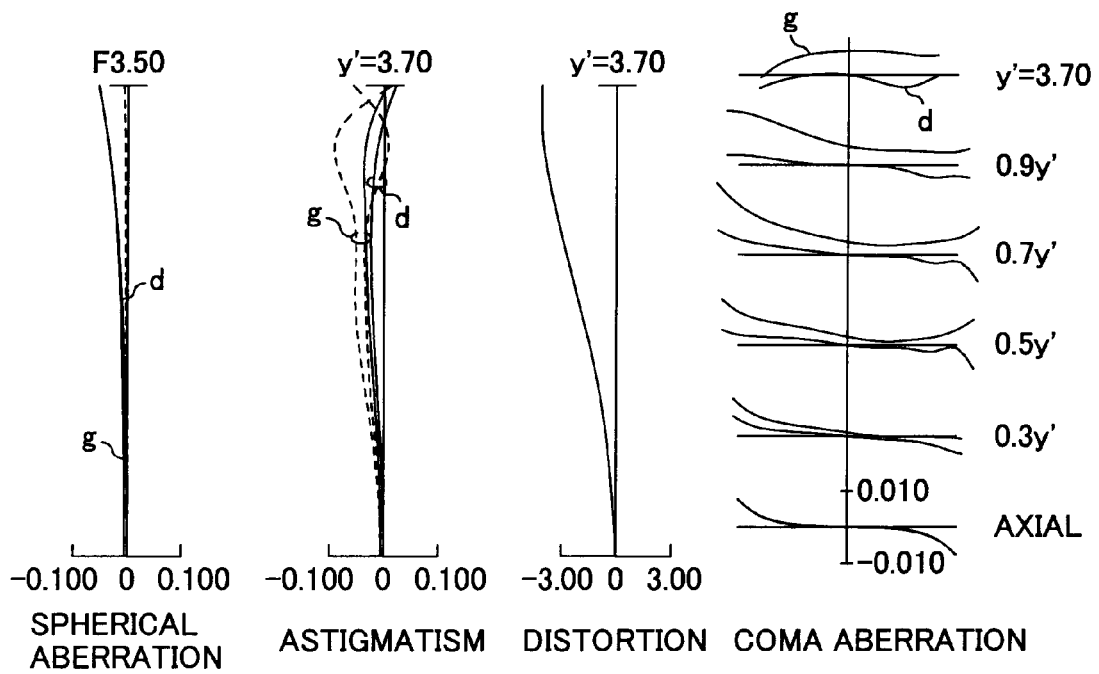
FIG. 23 is a drawing illustrating the aberration at the short focus end in the embodiment 6.
Figure 24:
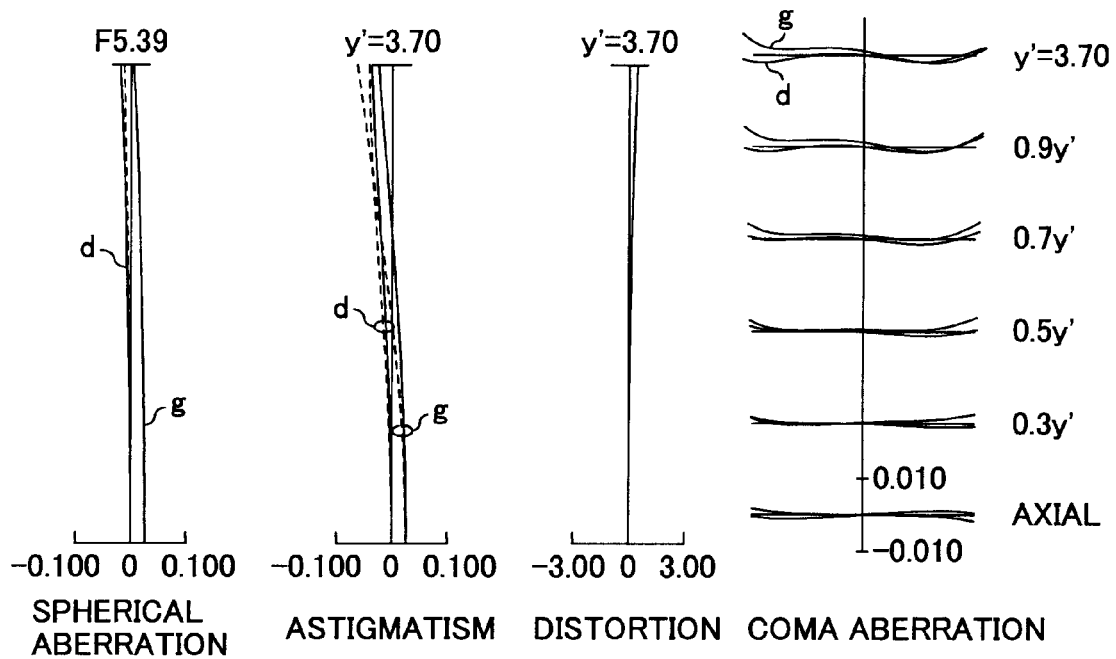
FIG. 24 is a drawing illustrating the aberration at the medium focal length in the embodiment 6.
Figure 25:
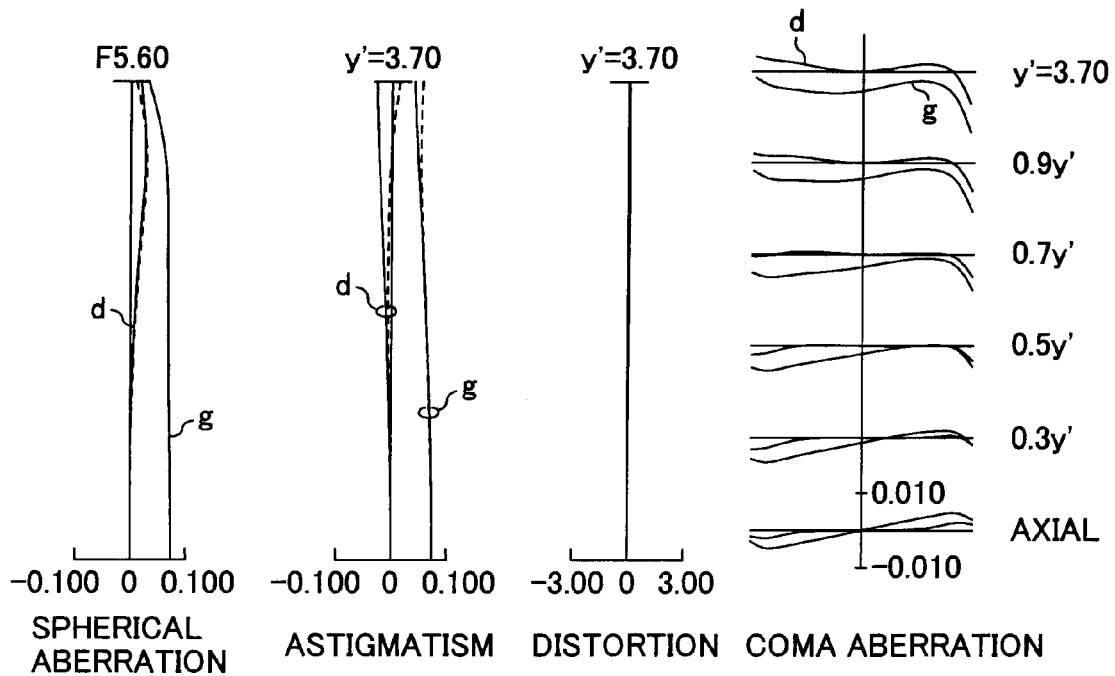
FIG. 25 is a drawing illustrating the aberration at the telephoto end in the embodiment 6.

The values of parameters of the conditions $f_{ap}/f_w = 2.24$
$|r_{3R}|/f_w$ : irrelevant
$X_1/f_T = 0.259$
$X_3/f_T = 0.224$
$|f_2|/f_3 = 0.572$
$f_1/f_w = 6.01$
$d_{SW}/f_T = 0.194$ FIG. 6 illustrates the configuration of lens groups of the zoom lens in the embodiment 6, at the wide-angle end, at the medium focal length, and at the telephoto end, in the same manner as FIG. 1. And, FIG. 23, FIG. 24, and FIG. 25 illustrate the aberration at the short focus end, the aberration at the medium focal length, and the aberration at the telephoto end, respectively in this order.

The anomalous dispersive lens satisfying the condition (1) through the condition (3) is the "positive lens placed at the second position from the aperture stop" of the third lens group.

Embodiment 7:
f = 4.74-31.91, F = 3.50-5.56, ω = 39.21-6.45

| surface number | R | D | $N_d$ | $v_d$ | $\Delta\theta_{g,F}$ | name of glass type |
|---|---|---|---|---|---|---|
| 01 | 39.369 | 1.00 | 1.92286 | 18.90 | 0.0386 | OHARA S-NPH2 |
| 02 | 24.475 | 2.77 | 1.60300 | 65.44 | 0.0045 | OHARA S-PHM53 |
| 03 | 272.535 | 0.10 | | | | |
| 04 | 18.555 | 2.31 | 1.77250 | 49.60 | −0.0092 | OHARA S-LAH66 |
| 05 | 47.482 | variable (A) | | | | |
| 06* | 34.963 | 0.74 | 1.88300 | 40.76 | −0.0088 | OHARA S-LAH58 |
| 07 | 4.174 | 2.22 | | | | |
| 08 | 46.284 | 2.06 | 1.92286 | 18.90 | 0.0386 | OHARA S-NPH2 |
| 09 | −9.068 | 0.64 | 2.00330 | 28.27 | 0.0023 | OHARA S-LAH79 |
| 10* | −181.083 | variable (B) | | | | |
| 11 | aperture | variable (C) | | | | |
| 12* | 6.859 | 3.02 | 1.58913 | 61.15 | −0.0043 | OHARA L-BAL35 |
| 13* | −8.481 | 0.10 | | | | |
| 14 | 13.024 | 2.11 | 1.61800 | 63.33 | 0.0051 | OHARA S-PHM52 |
| 15 | −8.881 | 0.70 | 1.69895 | 30.13 | 0.0103 | OHARA S-TIM35 |
| 16 | 5.023 | variable (D) | | | | |
| 17* | 9.052 | 2.37 | 1.52470 | 56.20 | | optical plastic |
| 18 | −41.978 | variable (E) | | | | |
| 19 | −18.873 | 1.00 | 1.83481 | 42.71 | −0.0082 | OHARA S-LAH55 |
| 20 | −44.439 | variable (F) | | | | |
| 21 | ∞ | 0.90 | 1.51680 | 64.20 | | various filters |
| 22 | ∞ | | | | | |

Aspherical surface

The sixth surface

K = 0.0,
$A_4 = 2.06279 \times 10^{-5}, A_6 = 5.51631 \times 10^{-7}, A_8 = -8.31073 \times 10^{-8}$,
$A_{10} = 1.10109 \times 10^{-9}$
The tenth surface K = 0.0,
$A_4 = -5.32236 \times 10^{-4}, A_6 = 2.77146 \times 10^{-6}, A_8 = -1.08697 \times 10^{-6}$,
$A_{10} = -3.45260 \times 10^{-8}$
The twelfth surface K = 0.0,
$A_4 = -9.60867 \times 10^{-4}, A_6 = 4.83329 \times 10^{-6}, A_8 = -2.96877 \times 10^{-7}$,
$A_{10} = -7.32967 \times 10^{-8}$
The thirteenth surface K = 0.0,
$A_4 = 3.22078 \times 10^{-4}, A_6 = -1.79339 \times 10^{-6}, A_8 = 2.46395 \times 10^{-7}$,
$A_{10} = -7.94954 \times 10^{-8}$
The seventeenth surface K = 0.0,
$A_4 = -7.38254 \times 10^{-5}, A_6 = 7.96986 \times 10^{-6}, A_8 = -3.63471 \times 10^{-7}$,
$A_{10} = 7.86601 \times 10^{-9}$ Variables

| | Short focus end f = 4.739 | medium focal length f = 12.347 | long focus end f = 31.908 |
|---|---|---|---|
| A | 0.600 | 8.536 | 14.109 |
| B | 7.725 | 2.132 | 1.000 |
| C | 4.525 | 3.983 | 0.650 |
| D | 2.915 | 6.118 | 10.968 |
| E | 1.598 | 2.090 | 1.238 |
| F | 0.780 | 0.780 | 0.780 |

-continued

Embodiment 7:
f = 4.74-31.91, F = 3.50-5.56, ω = 39.21-6.45

Figure 7:
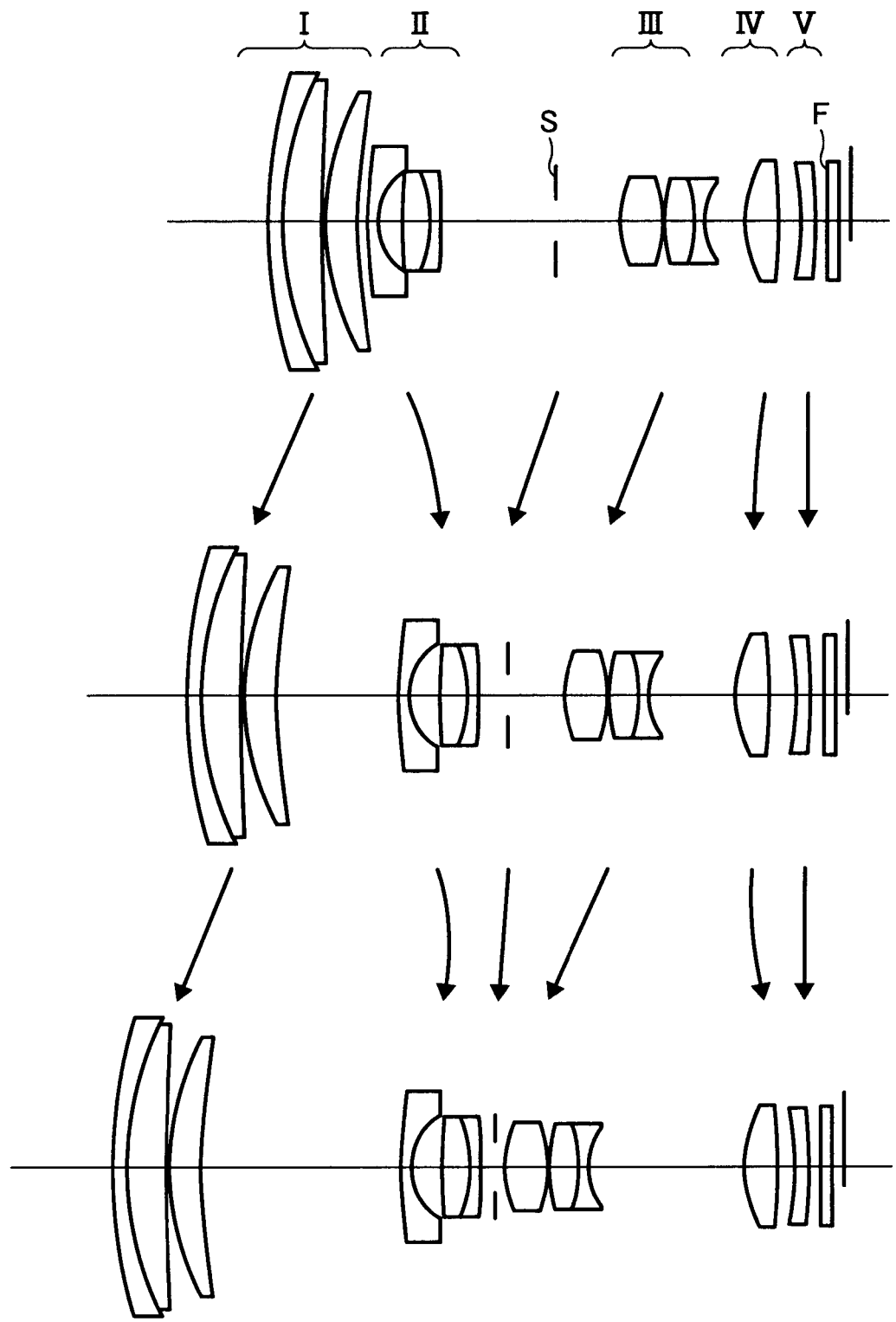
FIG. 7 is a drawing illustrating the configuration of lenses and the movement of each lens group in the embodiment 7.
Figure 26:
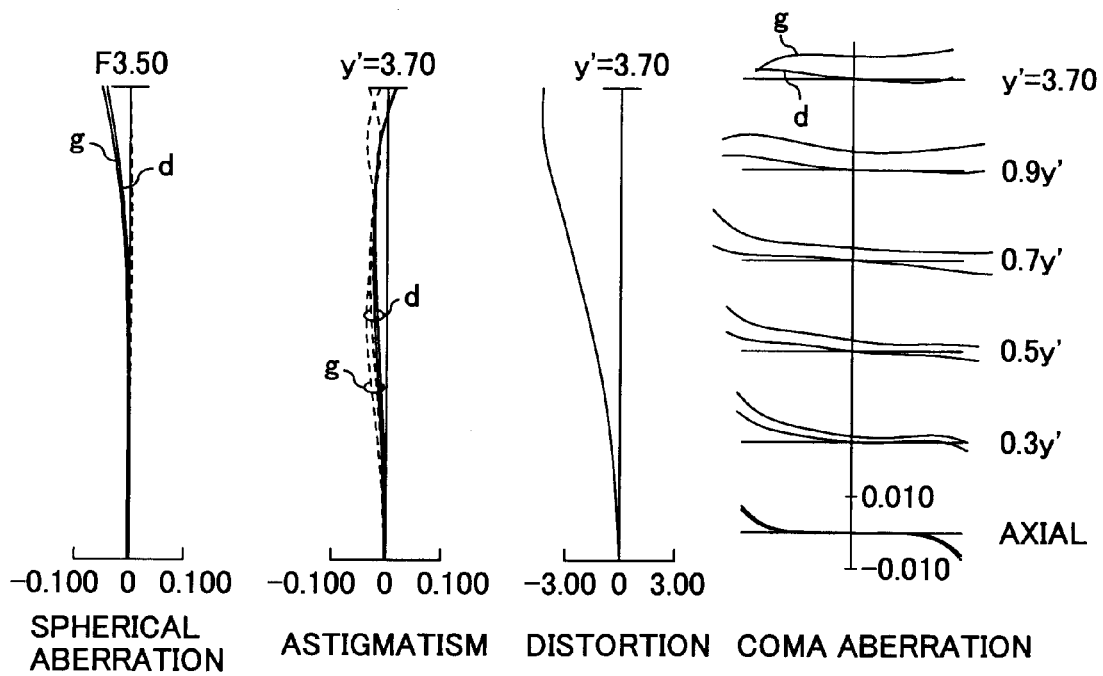
FIG. 26 is a drawing illustrating the aberration at the short focus end in the embodiment 7.
Figure 27:
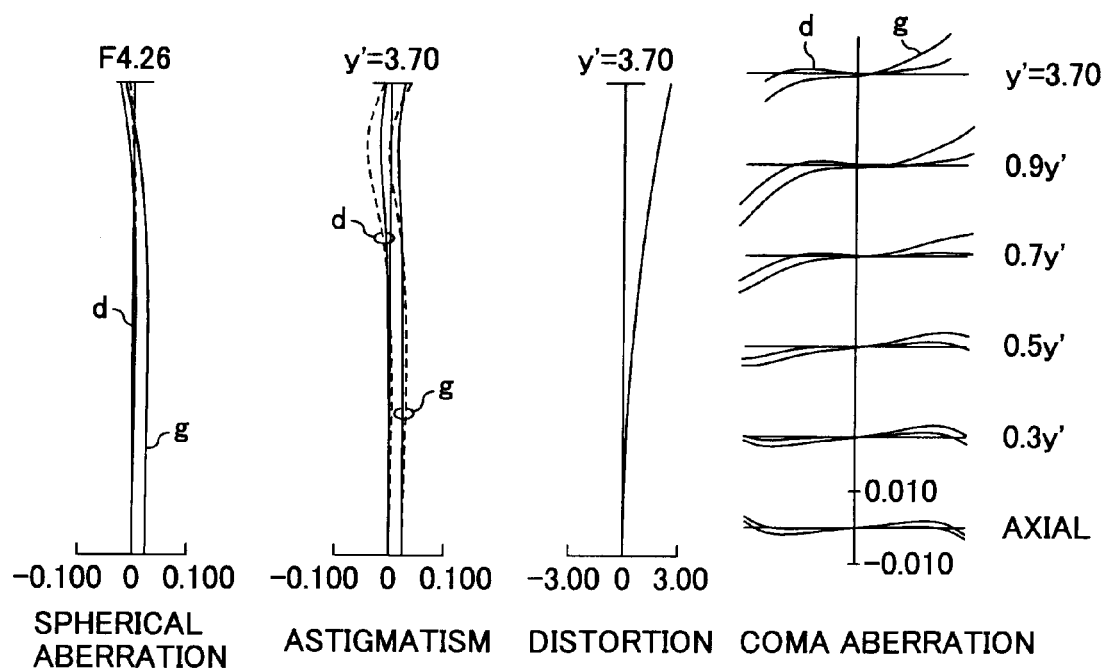
FIG. 27 is a drawing illustrating the aberration at the medium focal length in the embodiment 7.
Figure 28:
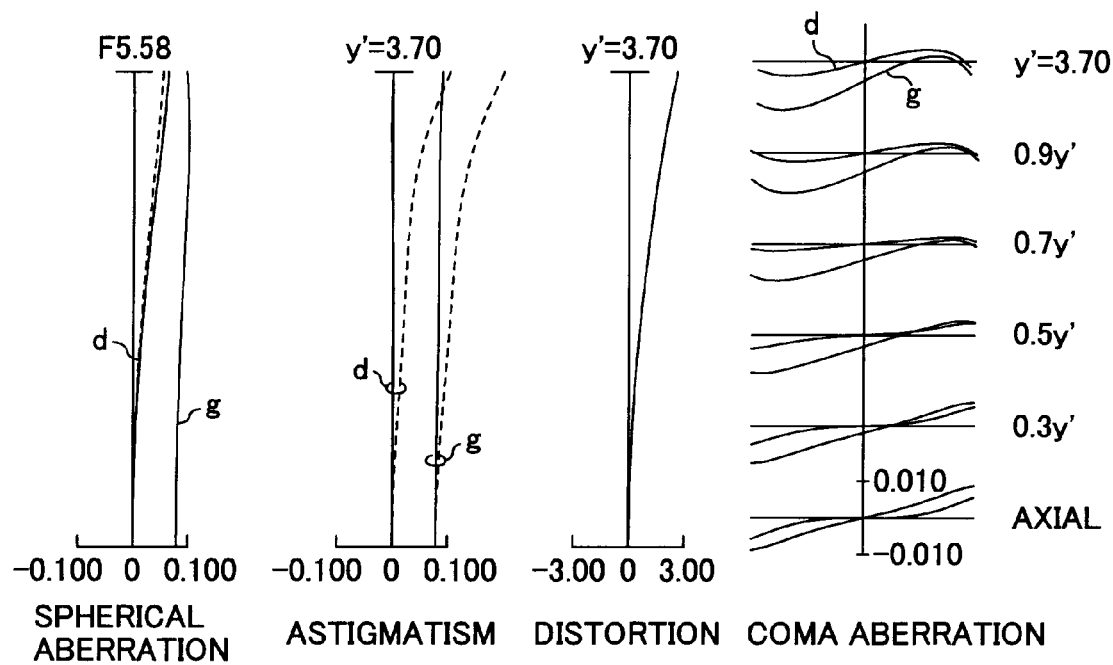
FIG. 28 is a drawing illustrating the aberration at the telephoto end in the embodiment 7.

The parameter values of the conditions $f_{ap}/f_w = 1.87$
$|r_{3R}|/f_w = 1.06$
$X_1/f_T = 0.331$
$X_3/f_T = 0.241$
$|f_2|/f_3 = 0.662$
$f_1/f_w = 6.21$
$d_{SW}/f_T = 0.142$ FIG. 7 illustrates the configuration of lens groups of the zoom lens in the embodiment 7, at the wide-angle end, at the medium focal length, and at the telephoto end, in the same manner as FIG. 1. And, FIG. 26, FIG. 27, and FIG. 28 illustrate the aberration at the short focus end, the aberration at the medium focal length, and the aberration at the telephoto end, respectively in this order.

The anomalous dispersive lens satisfying the condition (1) through the condition (3) is the "positive lens placed at the second position from the aperture stop" of the third lens group.

In conclusion, one embodiment of a personal digital assistant will be described with reference to FIG. 29 and FIG. 30.

Figure 30:
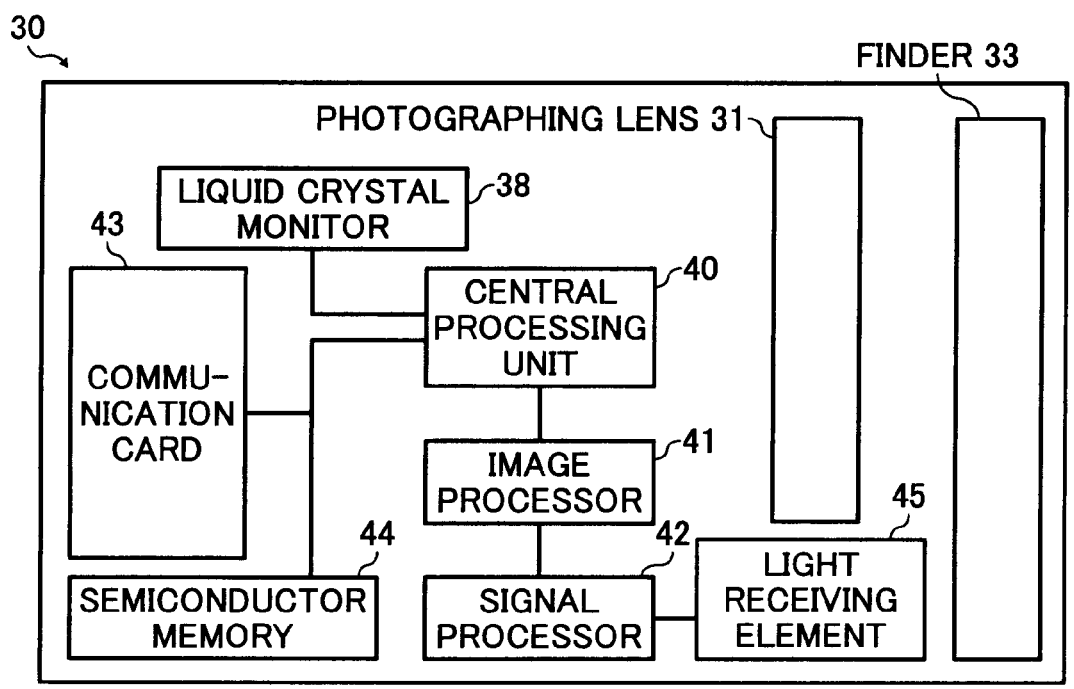
FIG. 30 is a drawing explaining the system of the device illustrated in FIGS. 29A, 29B, 29C.

As shown in FIG. 30, a personal digital assistant 30 includes a photographing lens 31 and a light receiving element (area sensor) 45 being an imaging element, which forms an "image of the object to be photographed" by the photographing lens 31 on the light receiving element 45 and reads the image by the light receiving element 45.

Any one of the zoom lenses in accordance with the present invention, concretely, any one of the above embodiments 1-7 is used as the photographing lens 31. As the light receiving element 45 can be used one having 5-8 million pixels or more, for example, a CCD area sensor having the diagonal length 9.1 mm of light receiving area, the pixel pitch 2.35 μm, and the pixel number of about 7 million, or a CCD area sensor having the diagonal length 9.1 mm of light receiving area, the pixel pitch 2 μm, and the pixel number of about 10 million.

As shown in FIG. 30, the out put from the light receiving element 45 is processed and converted into digital information by a signal processor 42, which is controlled by a central processing unit 40. The image information converted into digital information by the signal processor 42 experiences a predetermined image processing in an image processor 41 controlled by central processing unit 40 and the resultant information is recorded in a semiconductor memory 44. A liquid crystal monitor 38 can display an "image now being photographed" as well as an "image being recorded in the semiconductor memory 44". It is also possible to transmit the image information recorded in the semiconductor memory 44, by means of a communication card 43 or the like.

Figure 29A:
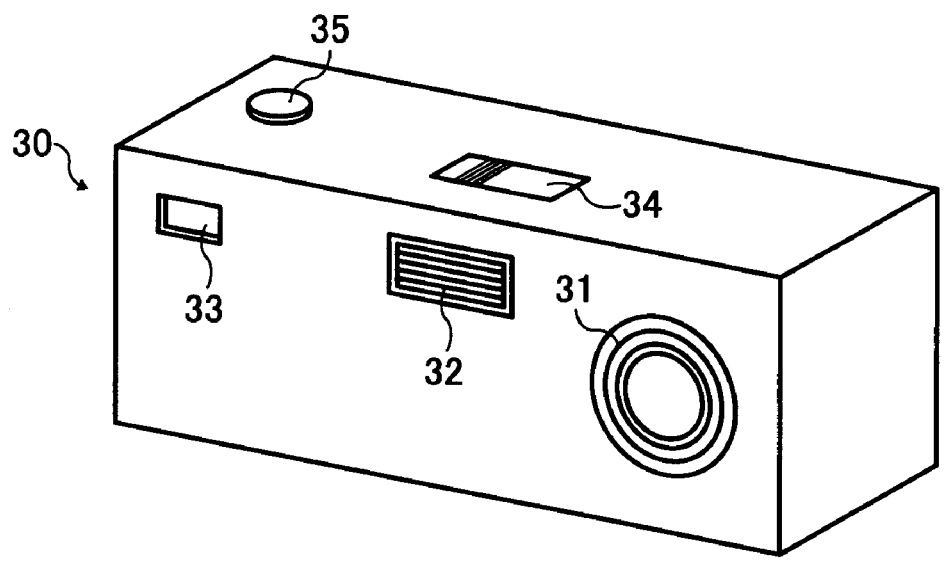
FIG. 29A is a drawing explaining a personal digital assistant in the embodiment 1.
Figure 29B:
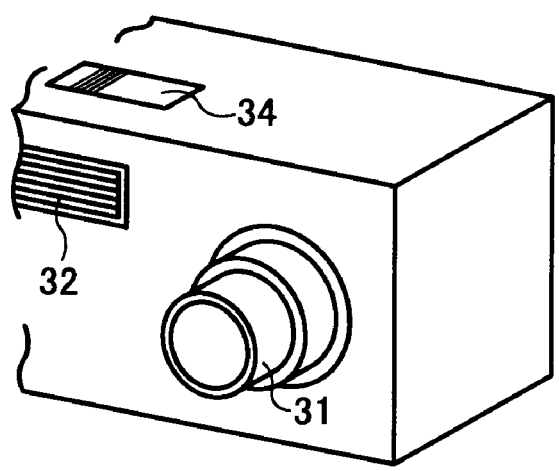
FIG. 29B is a drawing explaining a personal digital assistant in the embodiment 1.
Figure 29C:
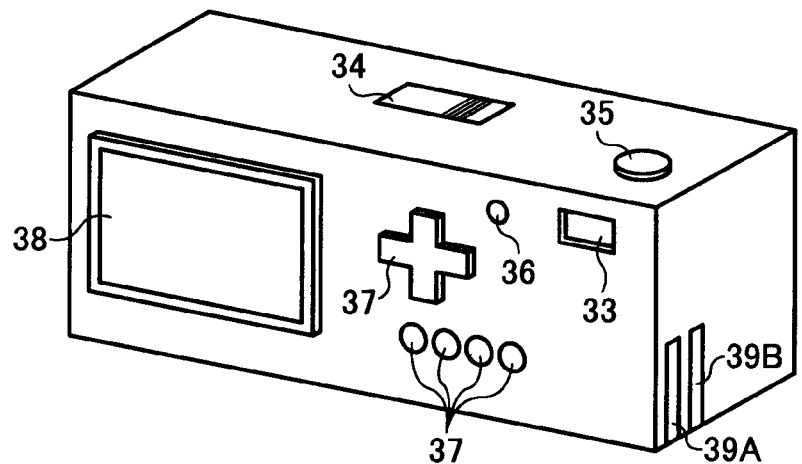
FIG. 29C is a drawing explaining a personal digital assistant in the embodiment 1.

As shown in FIG. 29A, the photographing lens 31 is "in a collapsed sate" while a user carries the device; as the user powers it by operating a power switch 36 illustrated in FIG. 29C, a lens barrel is pulled out as illustrated in FIG. 29B. At this moment, each lens group of the zoom lens assumes, for example, the "configuration at the short focus end" inside the lens barrel; if the user operates a zoom lever 34, it will vary the configuration of each lens group, and the magnification can be changed toward the long focus end. Here, a finder 33 interlocks with the variation of angular field of the photographing lens 31 to change the magnification.

A half-pressing of a shutter button 35 will make a focusing. In case of using the zoom lens in the embodiment 1 through the embodiment 4, the focusing is made by the movement of the second lens group or the fourth lens group, or by the movement of the light receiving element 45. Further pressing the shutter button 35 will perform a photographing; thereafter, the above image information processing is performed. The symbol 32 denotes a flash-gun.

For displaying the image recorded in the semiconductor memory 44 on liquid crystal monitor, or for transmitting it by means of the communication card 43, the user operates operation buttons 37 illustrated in FIG. 29C. When using the semiconductor memory 44 and the communication card 43, etc., the user inserts them into the dedicated or universal slots 39A, 39B.

When the photographing lens 31 is in the collapsed state, each lens group of the zoom lens is not necessarily placed in a row on the optical axis; if a mechanism is made to evacuate the third lens group from the optical axis and store it in parallel to the other lens groups, a further downsizing of the device will be achieved.

The zoom lens in the embodiment 1 through the embodiment 4 can be applied to the personal digital assistant as mentioned above, as the photographing lens 31; and a high image quality and miniaturized personal digital assistant using a light receiving element of over 5-8 million pixels can be realized.

The above anomalous dispersiveness $\Delta\theta_{g,F}$ is a "distance in the direction parallel to the vertical axis" between the above standard line and the coordinate point on the above two-dimensional coordinate plane of the "glass type of a positive lens" of the above third lens group.

The partial dispersion ratio $\theta_{g,F}$ is a "physical quantity determined for each glass type". The "standard line" is, as mentioned above, the straight line connecting the coordinate point having the partial dispersion ratio $\theta_{g,F}$ (K7: 0.5432) and the Abbe number $v_d$ (K7: 60.49) of the standard glass type K7 as the vertical and horizontal coordinates, respectively, and the coordinate point having the partial dispersion ratio $\theta_{g,F}$ (F2: 0.5830) and the Abbe number $v_d$ (F2: 36.26) of the standard glass type F2 as the vertical and horizontal coordinates, respectively.

The standard glass type K7 is specifically "the glass type name: NSL7 manufactured by the OHARA INC.", and the standard glass type F2 is the "glass type name: PBM2 manufactured by the OHARA INC."

Since the zoom lens of this invention includes the first lens group through the third lens group in order from the object side, as mentioned above, it can be made up into a "three group configuration"; since the zoom lens may include the fourth lens group on the image side of the third lens group, as described above, it can be made up into a "four group configuration", and it can be made up into a "five group configuration having a fifth lens group of a weaker refracting power" on the image side of the fourth lens group".

The zoom lens in accordance with the present invention is particularly effective in case of the three group configuration; the zoom lens in accordance with the present invention is particularly effective in case of the four group configuration. Naturally, the zoom lens in accordance with the present invention is also effective in case of the five group configuration.

The zoom lens according to one embodiment of the present invention can naturally be used as a "zoom photographing lens used for a silver halide camera", and the imaging device according to one embodiment of the present invention can be implemented as the "silver halide camera"

The following are complementary descriptions to the above. The zoom lens of this invention has a "configuration including at least a first lens group having a positive refracting power, a second lens group having a negative refracting power, and a third lens group having a positive refracting power, in order from the object side"; and it can be implemented as the three group configuration, the four group configuration, and the configuration having the "fifth lens group of a weaker refracting power" on the image side of the fourth group.

In the zoom lens by the configuration having at least three groups of positive/negative/positive from the object side, that is, the three group configuration of a positive/negative/positive, the four group configuration of a positive/negative/positive/positive, and the five group configuration having the fifth lens group of a weaker refracting power on the image side of the positive/negative/positive/positive, it is a general exercise that the second lens group is made up as the so-called variator taking on the principal function of changing magnification.

However, the zoom lens of this invention makes the third lens group share the burden of changing magnification, to thereby lighten the burden on the second lens group, thus securing the degree of freedom of the correction of aberration, which becomes difficult accompanied with pursuing a wider angle and a higher magnification.

When changing magnification from the wide-angle end toward the telephoto end, the lens groups move so that the spacing between the first lens group and the second lens group increases, and the spacing between the second lens group and the third lens group decreases. In this manner, when changing magnification from the wide-angle end toward the telephoto end, the spacing between the first lens group and the second lens group increases, and the spacing between the second lens group and the third lens group decreases; as the result, the magnifications (absolute value) of both the second lens group and the third lens group increase, thus sharing the function of changing magnification In this case, as the zoom lens according to one embodiment of the present invention, when changing magnification from the wide-angle end toward the telephoto end, a significant movement of the first lens group toward the object side will lower the "height of rays passing the first lens group" at the wide-angle end, to thereby control an "increased size of the first lens group with the widening of the angle"; and it will secure a significant spacing between the first lens group and the second lens group at the telephoto end, to thereby achieve a longer focal length.

Further, in case "securing the exit pupil distance" is not so important, depending on the characteristics of the imaging element used in combination with the zoom lens of this invention, or in case a focusing is performed by the second lens group, the forth lens group and the fifth lens group are not essential, and the three group configuration of the first lens group through the third lens group will be able to attain a desired performance.

And in considering that "to form images is one of the major roles" of the third lens group, in the case of the four group configuration of the first lens group through the fourth lens group, or in the case of including the fifth lens group and so forth, it is possible to attain desired characteristics also by, when changing magnification from the wide-angle end toward the telephoto end, increasing the spacing between the first lens group and the second lens group, decreasing the spacing between the second lens group and the third lens group, and varying the spacing between the third lens group and the fourth lens group.

Now, as the zoom lens of this invention, to intend to attain the "high magnification ratio over 6.5 to 10" and especially to elongate the focal length at the telephoto end will make it difficult to correct the second order spectrum of the axial chromatic aberration on the telephoto side. And to intend to shorten the focal length at the wide-angle end and seek a "wider angle" will make it difficult to correct the second order spectrum of the magnification chromatic aberration on the wide angular side.

The correction of the axial/magnification chromatic aberration is performed in a manner that the "image forming positions coincide at two wavelengths in the usable wavelength region"; however, the forming positions do not necessarily coincide inside a wavelength region put between the above two wavelengths and in a "wavelength region outside the two wavelengths". Such a "residual chromatic aberration" is referred to as a second order spectrum.

The sensitivity (visibility) of human eyes heightens at a wavelength of the green region. If the chromatic aberration in such a "wavelength region of high visibility" is high, the image will be indistinct, and the "resolution of the image by visual observation" will lower.

The same is the case with imaging by a color imaging element. In a general color imaging element having a red/green/blue mosaic filter, about "50% of all the pixels" possess a green filter in order to secure the resolution. Accordingly, the output from the "pixels in charge of the green region" becomes predominant in the luminance signal generated by the signal processing; and if the chromatic aberration in this wavelength region is high, the resolution of a reproduced image will lower.

On the other hand, in most of color imaging elements, the sensitivity on the shorter wavelength side is relatively high, compared with human eyes or silver halide color films; and a "blurred color by the chromatic aberration in the blue to purple region" is likely to stand out in the reproduced image. In order to reduce such a blurred color, the chromatic aberration in the blue to purple region is needed to be decreased. However, to decrease the "chromatic aberration in the blue to purple region" without sufficiently correcting the second order spectrum will increase the chromatic aberration in the green region, which invites the above "lowering of the resolution in the reproduced image".

Thus, the "correction of the second order spectrum of the chromatic aberration" has an extreme importance in terms of securing the resolution of an image.

The zoom lens of this invention is to correct the second order spectrum of the chromatic aberration, by using an "anomalous dispersive glass (glass type of high anomalous dispersiveness)"; and, it has a notable feature in the place of it being used and the optical characteristics thereof.

In order to reduce the second order spectrum of the axial chromatic aberration, it is generally known that "to use a special low dispersive glass in the lens group of a high axial height of rays" is extremely effective.

In the third lens group of the zoom lens of this invention, the "axial height of rays is high next to the first lens group"; therefore, adopting a special low dispersive glass in the third lens group will sufficiently reduce the second order spectrum of the axial chromatic aberration.

However, the special low dispersive glass generally has a low refractive index, and a low "capability of correcting the monochromatic aberration". Therefore, in "reducing the monochromatic aberration and the chromatic aberration in a properly balanced manner" with a few pieces of the third lens group, to use a special low dispersive glass does not necessarily exhibit a sufficient effect.

In the zoom lens of this invention, "at least a piece of positive lens of the third lens group" is made up with a glass type having the refractive index, Abbe number, and anomalous disversiveness that satisfy the condition (1) through the condition (3). Thereby, if the third lens group is made up with as few as three pieces or so, it is possible to correct the monochromatic aberration sufficiently, while reducing the second order spectrum of the chromatic aberration.

If the refractive index $N_d$ of the condition (1) is lower than 1.58, the "correction of the monochromatic aberration becomes insufficient". If the Abbe number $v_d$ of the condition (2) is 60 or below, the "correction of the chromatic aberration becomes insufficient". And, if the anomalous dispersiveness $\Delta\theta_{g,F}$ of the condition (3) is lower than 0.003, the "correction of the second order spectrum of the chromatic aberration becomes insufficient". Here, the upper limits of the conditions (1) and (2) are the maximum ones in the actually existing glass type.

The value of the parameter $\Delta\theta_{g,F}$ of the condition (3) is preferred to be as high as possible; however, on the condition that the glass type satisfies the conditions (1) and (2), the one over 0.05 is not practical in terms of the cost and so forth, although it is not impossible to manufacture that.

In the zoom lens according one embodiment of the present invention, the fourth lens group is provided mainly "for securing the exit pupil distance (telecentric quality)", and for focusing accompanied with its movement". However, in order to downsize the zoom lens system, preferably the fourth lens group has as simple a configuration as possible; and it is preferably made up with a piece of positive lens, or two pieces of a negative lens and a positive lens.

The condition (4) is preferably satisfied by at least one of the positive lenses (positive lens manufactured by the glass type satisfying the condition (1) through the condition (3) made up with the anomalous dispersive glass of the third lens group. In the condition (4), if the parameter $f_{ap}/f_w$ is larger than 2.5, the refracting power of the lens using the anomalous dispersive glass will not necessarily be sufficient for "reducing the second order spectrum sufficiently", and there will be "a case of a sufficient correction of the chromatic aberration not being performed." On the other hand, if the parameter $f_{ap}/f_w$ is smaller than 1.0, it will be difficult to gain the balance of a chromatic aberration correction and a spherical aberration correction.

In case there is the fourth lens group having a positive refracting power on the image side of the third lens group, and in case there is the fifth lens group having a weaker refracting power, the following condition (3A) is preferably satisfied, instead of the condition (3).

$$1.0 < f_{ap}/f_w < 2.0 \tag{3A}$$

It is preferable that the third lens group has at least two positive lenses and one negative lens, and one piece of the positive lenses has an aspherical surface; in this case, the lens having the aspherical surface is not required to satisfy the condition (1) through the condition (3).

Assuming that an aperture stop is provided on the object side of the third lens group or on the image side thereof, the "aspherical surface for correcting a spherical aberration" should be placed near the aperture stop. The lens using an anomalous dispersive glass satisfying the condition (1) through the condition (3) should be placed "somewhat distantly" from the aperture stop. Thereby, it becomes possible to achieve the effect of reducing not only the axial chromatic aberration but also the "second order spectrum of the magnification chromatic aberration".

Therefore, the most reasonable configuration is that the "one near the aperture stop" of the two positive lens of the third lens group is an aspherical lens, and "the other one distant from the aperture stop" is a lens of an anomalous dispersive glass.

The third lens group is the "important lens group that performs the function of changing magnification as well as forming the image"; and a sufficient correction of the aberration becomes possible with the above configurations.

For a preferable correction of the aberration, as stated above, a negative lens with a strong concave surface facing toward the image side should be disposed on the most image side of the third lens group, and the condition (5) should be satisfied.

If the parameter $|r_{3R}|/f_w$ of the condition (5) becomes smaller than the lower limit 0.8, however, the "correction of a spherical aberration is likely to become excessive", and if it exceeds the upper limit 1.6, the "correction of a spherical aberration is likely to become insufficient". Further, to gain the balance of a coma aberration as well as a spherical aberration becomes difficult outside the range of the condition (5), and an extroversive or introversive coma aberration is likely to appear on an off-axis periphery.

Further in relation to the "movement of the first lens group" that is important for pursuing a wider angle and a longer focal length, the condition (6) is preferably satisfied, as stated above.

If the parameter $X_1/f_T$ of the condition (6) falls below the lower limit 0.20, the contribution to changing the magnification of the second lens group will decrease; and it will be necessary to increase the load on the third lens group, or to increase the refracting powers of the first lens group and the second lens group. In any case, it will invite deteriorations of various aberrations. The whole length of the lens at the wide-angle end also becomes long, and the height of rays passing the first lens group increases, thus resulting in an expanded size of the first lens group.

If the parameter $X_1/f_T$ of the condition (6) exceeds the upper limit 0.70, the whole length at the wide-angle end will become too short, or the whole length at the telephoto end will become too long. If the whole length at the wide-angle end becomes too short, the movement space of the third lens group will be restricted, and the contribution to changing the magnification of the third lens group will be decreased to make the whole aberration correction difficult. If the whole length at the telephoto end becomes too long, it will be not only an obstacle to downsizing in the whole length direction, but also an inducement to expanding in the radial direction for acquiring the marginal rays at the telephoto end, or it will lead to a deterioration of image performance due to manufacturing errors such as an inclination of the lens barrel.

It is further preferable that the parameter $X_1/f_T$ satisfies the following condition (6A).

$$0.25 < X_1/f_T < 0.55 \tag{6A}$$

The condition (7) is preferably satisfied in relation to the movement of the third lens group. If the parameter $X_3/f_T$ falls below the lower limit 0.15, the contribution to changing magnification of the third lens group will decrease; and it will be necessary to increase the load on changing magnification of the second lens group, or to intensify the refracting power of the third lens group itself. In any case, it will invite deteriorations of various aberrations.

If the parameter $X_3/f_T$ exceeds the upper limit 0.40, the whole length of the lens at the wide-angle end will elongate, and the height of rays passing the first lens group will increase, which invites an expanded size of the first lens group.

It is further preferable that the parameter $X_3/f_T$ satisfies the following condition (7A).

$$0.20 < X_3/f_T < 0.35 \tag{7A}$$

The conditions (8), (9) are the "ones that the refracting power of each lens group preferably satisfies from the viewpoint of the aberration correction".

If the parameter $|f_2|/f_3$ of the condition (8) falls below the lower limit 0.45, the refracting power of the second lens group will increase excessively. If it exceeds the upper limit 0.85, the refracting power of the third lens group will increase excessively. In any case, "aberration fluctuations when changing magnification" are likely to increase.

If the parameter $f_1/f_W$ of the condition (9) falls below the lower limit 5.0, the image forming magnification of the second lens group will approximate to an equal magnification to increase the efficiency of changing the magnification, which is advantageous to a higher magnification ratio. However, a high refracting power is required to each lens of the first lens group, and this leads to a harmful effect, especially a deterioration of the chromatic aberration at the telephoto end. It also leads to an increased thickness and a larger aperture of the first lens group, which is disadvantageous to downsizing, especially, in storage.

If the parameter $f_1/f_W$ exceeds the upper limit 11.0, the contribution to changing the magnification of the second lens group will decrease, which makes a higher magnification ratio difficult.

In the zoom lens of this invention, an aperture stop is placed between the second lens group and the third lens group, and the aperture stop can "be moved independently from the adjoining lens groups". This configuration makes it possible to "select the most appropriate path of rays" at any position in a range of a high magnification ratio over 6.5. Thereby, it becomes possible to raise the degree of freedom for correcting especially the coma aberration and the curvature of field and so forth, and to enhance off-axis performances.

The spacing between the aperture stop and the third lens group is preferably "wider at the wide-angle end than at the telephoto end". The third lens group using an anomalous dispersive glass "is placed distantly from the aperture stop at the wide-angle end, and is placed close to the aperture stop at the telephoto end". Thereby, the anomalous dispersiveness exhibits the effect of correcting the second order spectrum of the magnification chromatic aberration at the wide-angle end, and exhibits the effect of correcting the second order spectrum of the axial chromatic aberration at the telephoto end. Therefore, the chromatic aberration can be corrected much better over the whole range of the magnification. Moreover, it becomes possible "to place the aperture stop closer to the first lens group at the wide-angle end, and to further lower the height of rays passing the first lens group", which achieves a further downsizing of the first lens group.

By the above reason, in case of making the "spacing between the aperture stop and the third lens group" wider at the wide-angle end than at the telephoto end, it is preferable that an axial spacing $d_{SW}$ between the aperture stop at the wide-angle end and the surface on the most object side of the third lens group, and the focal length $f_T$ of the whole system at the telephoto end satisfy the following condition (10).

$$0.03 < d_{SW}/f_T < 0.20 \tag{10}$$

If the parameter $d_{SW}/f_T$ of the condition (10) falls below the lower limit 0.03, the height of rays passing the third lens group at the wide-angle end will decrease, which makes it difficult to effectively reduce the second order spectrum of the power chromatic aberration at the wide-angle end. And, the height of rays passing the first lens group at the wide-angle end will excessively increase, which invites an increased size of the first lens group.

If the parameter exceeds the upper limit 0.20, the height of rays passing the third lens group at the wide-angle end will excessively increase; and the image surface excessively inclines or a barrel-shaped distortion increases, which makes it difficult to secure the performance especially in a wide angular range.

The first lens group is preferably configured to have at least a piece of negative lens and at least a piece of positive lens, in order from the object side. More specifically, it is preferably configured with two pieces of, in order from the object side, a negative meniscus lens with a convex surface facing toward the object side and a positive lens with a strong convex surface facing toward the object side, or it is preferably configured with three pieces of, in order from the object side, a negative meniscus lens with a convex surface facing toward the object side, a positive lens with a strong convex surface facing toward the object side, and a positive lens with a strong convex surface facing toward the object side.

For a higher magnification ratio, especially for elongating the focal length at the telephoto end, the "composite power of the lens groups up to the second lens group" has to be increased; to that degree, the aberration generated by the first lens group is expanded on the image surface. Accordingly, it is necessary to sufficiently reduce the aberration generated by the first lens group in order for seeking a higher magnification ratio; and it is preferable to apply the above configuration to the first lens group.

The second lens group is preferably configured with three pieces of, in order from the object side, a negative lens with a surface of large curvature facing toward the image side, a positive lens with a surface of large curvature facing toward the image side, and a negative lens with a surface of large curvature facing toward the object side.

In case of configuring a changing magnification lens group having a negative refracting power with three pieces of lenses, there is a well-known method of placing a negative lens, a negative lens, and a positive lens in order from the object side. However, in comparison with this configuration, the above configuration excels in the "capability of correcting the power chromatic aberration accompanied with pursuing a wider angle". Here, the second lens and the third lens from the object side may be united appropriately.

Here, each lens of the second lens group preferably satisfies the following conditional formulas.

$$1.65 < N21 < 1.90, \; 35 < v21 < 55$$

$$1.75 < N22 < 1.95, \; 15 < v22 < 35$$

$$1.75 < N23 < 1.90, \; 35 < v23 < 55$$

Here, N2i (i=1-3) denotes the refractive index of i-th lens from the object side of the second lens group, and v2i (i=1-3) denotes the Abbe number of i-th lens from the object side of the second lens group.

By selecting such glass type, a "better correction of the chromatic aberration" becomes possible.

The third lens group is preferably configured with three pieces of, in order from the object side, a positive lens, a positive lens, and a negative lens. Here, the second positive lens and the third negative lens from the object side may be united appropriately.

An aspherical surface is essential for seeking a further downsizing, while maintaining a satisfactory correction of aberrations. It is preferable that at least the second lens group and the third lens group each have one or more aspherical surfaces. Especially in the second lens group, to apply aspherical surfaces to "both the surface on the most object side and the surface on the most image side" will achieve a high effect for correcting a distortion and astigmatism, etc., which are likely to increase accompanied with pursuing a wider angle.

As an aspherical lens, the following can be used: lenses molded out of an optical glass and optical plastic (glass mold aspherical lens, plastic mold aspherical lens), and a lens wherein a thin resin layer is formed on the plane of a glass lens, and the surface of the resin layer is made aspherical (referred to as a hybrid aspherical lens, or a replica aspherical lens).

To make the open diameter of an aperture "constant regardless of the changing magnification" is preferable for a mechanical simplicity. However, by "increasing the open diameter at the longer focus end in comparison to that at the shorter focus end", it is possible to decrease the variations of F number accompanied with the changing magnification. And when the quantity of light to reach the image surface has to be decreased, the aperture diameter may be decreased; however, it is preferable "to decrease the quantity of light by inserting an ND filter or the like", without a remarkable change of the aperture diameter, which can prevent a resolving power from decreasing due to the diffraction phenomena.

As being thus described, a novel zoom lens can be realized according to this invention. The zoom lens of this invention, as described in the following embodiments, is capable of correcting the aberration satisfactorily, and achieving the magnification ratio over 6.5-10 while the half angle of view at the wide-angle end is 38 degrees or more, which is a sufficiently wide angle of view; besides, it is suitable for downsizing since it can be configured with 10-12 pieces of lenses, and is capable of realizing the resolving power corresponding to an imaging element of 5-8 million pixels.

Although the present invention has been described in terms of exemplary embodiments, it is not limited thereto. It should be appreciated that variations may be made in the embodiments described by persons skilled in the art without departing from the scope of the present invention as defined by the following claims. In addition, the number, position, shape, or the like of the components are not limited to the above embodiments, and can be changed to a number, position, shape or the like of components preferable for conducting the present invention. Moreover, no element or component in the present disclosure is intended to be dedicated to the public regardless of whether the element or component is explicitly recited in the following claims.

What is claimed is:

1. A zoom lens for photographing an image of an object, comprising:
   at least a first lens group having a positive refracting power;
   at least a second lens group placed on an image side of the first lens group having a negative refracting power; and
   at least a third lens group placed on an image side of the second lens group having a positive refracting power, the third lens group having at least a positive lens, when changing magnification from a wide-angle end toward a telephoto end, a spacing between the first lens group and the second lens group increasing, and a spacing between the second lens group and the third lens group decreasing, on an orthogonal two-dimensional coordinate plane taking a partial dispersion ratio $\theta_{g,F}$ defined by the formula: $\theta_{g,F}=(n_g-n_F)/(n_F-n_c)$, whereat $n_g$ is a refractive i to a g line, $n_F$ is a refractive index to an F line, and $n_c$ is a refractive index to a c line, on the vertical axis, and taking an Abbe number $v_d$ on the horizontal axis, when a straight line connecting a coordinate point ($v_d=60.49$, $\theta_{g,F}=0.5432$) of a standard glass type K7 and a coordinate point ($v_d=36.26$, $\theta_{g,F}=0.5830$) of a standard glass type F2 being defined as a standard line, and a deviation of the partial dispersion ratio $\theta_{g,F}$ of the glass type from the standard line on the two-dimensional coordinate plane being defined as an anomalous dispersiveness $\Delta\theta_{g,F}$ of the glass type, a refractive index $N_d$ and the Abbe number $v_d$ and the anomalous dispersiveness $\Delta\theta_{g,F}$ of the positive lens of the third lens group satisfying the following condition (1) through the condition (3)

$$N_d>1.58 \qquad (1)$$

$$v_d>60.0 \qquad (2)$$

$$0.05>\Delta\theta_{g,F}>0.003. \qquad (3)$$

2. A zoom lens according to claim 1, further comprising an aperture stop between the second lens group and the third lens group, wherein at least the first lens group and the third lens group move toward the object side when changing magnification from the wide-angle end toward the telephoto end, in such a manner that the spacing between the first lens group and the second lens group increases and the spacing between the second lens group and the third lens group decreases.

3. A zoom lens according to claim 1, further comprising a fourth lens group on an image side of the third lens group, wherein the spacing between the first lens group and the second lens group increases, the spacing between the second lens group and the third lens group decreases, and the spacing between the third lens group and the fourth lens group varies, when changing magnification from the wide-angle end toward the telephoto end.

4. A zoom lens according to claim 3, further comprising an aperture stop between the second lens group and the third lens group, wherein at least the first lens group and the third lens group move toward the object side when changing magnification from the wide-angle end toward the telephoto end, in such a manner that the spacing between the first lens group and the second lens group increases, the spacing between the second lens group and the third lens group decreases, and the spacing between the third lens group and the fourth lens group increases.

5. A zoom lens according to claim 1, wherein one piece of positive lens of the third lens group satisfies the condition (1) through the condition (3), and a focal length $f_{ap}$ of the positive lens and a focal length $f_w$ of the whole system at the wide-angle end satisfy the following condition (4)

$$1.0>f_{ap}/f_w<2.5. \qquad (4)$$

6. A zoom lens according to claim 1, wherein the third lens group has at least two pieces of positive lenses and one piece of negative lens, a first piece of the positive lenses satisfies the condition (1) through the condition (3), and a second piece of the positive lenses has an aspherical surface.

7. A zoom lens according to claim 6, wherein a negative lens with a strong concave surface facing toward the image side is disposed on a most image side of the third lens group, and a curvature radius $r_{3R}$ of the lens surface on the image side of the negative lens and the focal length $f_w$ of the whole system at the wide-angle end satisfy the following condition (5)

$$0.8 < |r_{3R}|/f_w < 1.6. \quad (5)$$

8. A zoom lens according to claim 1, wherein a whole movement $X_1$ of the first lens group when changing magnification from the wide-angle end toward the telephoto end and a focal length $f_T$ of the whole system at the telephoto end satisfy the following condition (6)

$$0.20 < X_1/f_T < 0.70. \quad (6)$$

9. A zoom lens according to claim 1, wherein a whole movement $X_3$ of the third lens group when changing magnification from the wide-angle end toward the telephoto end and the focal length $f_T$ of the whole system at the telephoto end satisfy the following condition (7)

$$0.15 < X_3/f_T < 0.40. \quad (7)$$

10. A zoom lens according to claim 1, wherein a focal length $f_2$ of the second lens group and a focal length $f_3$ of the third lens group satisfy the following condition (8)

$$0.45 < |f_2|/f_3 < 0.85. \quad (8)$$

11. A zoom lens according to claim 1, wherein a focal length $f_1$ of the first lens group and the focal length $f_w$ of the whole system at the wide-angle end satisfy the following condition (9)

$$5.0 < f_1/f_w < 11.0. \quad (9)$$

12. An imaging device comprising a zoom lens according to claim 1, as a photographing zoom lens.

13. An imaging device according to claim 12, wherein an object image by the zoom lens is formed on a light-receiving surface of a color imaging element.

14. An imaging device according to claim 13, wherein the imaging element has over 5 to 8 million pixels.

15. A personal digital assistant, comprising the imaging device according to claim 12.

* * * * *